(12) United States Patent
Namba et al.

(10) Patent No.: US 8,805,367 B2
(45) Date of Patent: Aug. 12, 2014

(54) METHOD AND APPARATUS FOR ALLOCATING TERMINAL IDENTIFIERS BASED ON COMMUNICATION FUNCTION

(75) Inventors: Hideo Namba, Chiba (JP); Shimpei To, Antibes (FR); Yasuhiro Hamaguchi, Ichihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 633 days.

(21) Appl. No.: 12/282,127

(22) PCT Filed: Mar. 12, 2007

(86) PCT No.: PCT/JP2007/054825
§ 371 (c)(1),
(2), (4) Date: Sep. 8, 2008

(87) PCT Pub. No.: WO2007/105685
PCT Pub. Date: Sep. 20, 2007

(65) Prior Publication Data
US 2009/0059849 A1    Mar. 5, 2009

(30) Foreign Application Priority Data

Mar. 14, 2006    (JP) ................................ 2006-069486

(51) Int. Cl.
*H04W 4/00* (2009.01)
(52) U.S. Cl.
USPC ........ 455/435.3; 455/418; 455/423; 455/434; 455/466; 370/328; 370/338
(58) Field of Classification Search
CPC ... H04L 1/0023; H04L 1/0083; H04L 1/1812; H04W 28/18; H04W 76/02; H04W 76/025; H04W 8/22; H04W 8/26
USPC ........ 455/435.2, 450, 415, 414.1, 432.1, 462, 455/410–411, 418–419, 423–425, 434, 466, 455/435.1; 370/328–338
See application file for complete search history.

(56) References Cited

U.S. PATENT DOCUMENTS

| | | | | |
|---|---|---|---|---|
| 2003/0007510 A1* | 1/2003 | Yeo et al. | ...................... | 370/469 |
| 2003/0227912 A1* | 12/2003 | Kachi | ........................... | 370/352 |
| 2004/0057401 A1* | 3/2004 | Dick et al. | .................... | 370/329 |
| 2005/0073974 A1* | 4/2005 | Kim et al. | ..................... | 370/329 |
| 2006/0034217 A1* | 2/2006 | Kwon et al. | ................... | 370/328 |
| 2007/0002812 A1* | 1/2007 | Malkamaki et al. | .......... | 370/338 |

FOREIGN PATENT DOCUMENTS

| | | |
|---|---|---|
| JP | 1-248851 A | 10/1989 |
| JP | 6-37929 A | 2/1994 |
| JP | 2002-539686 A | 11/2002 |
| JP | 2004-129079 A | 4/2004 |
| JP | 2004-510358 A | 4/2004 |

(Continued)

*Primary Examiner* — Quan M Hua
(74) *Attorney, Agent, or Firm* — Birch, Stewart, Kolasch & Birch, LLP

(57) ABSTRACT

A communication means which allocates a terminal identifier to a destination communication apparatus and carries out communication with the destination communication apparatus by use of a plurality of functions including an identifier generation section 152 for generating different terminal identifiers corresponding to a function used and an identifier allocation section 114 having an identifier selecting section 104 for allocation to the destination communication apparatus. Using a plurality of different terminal identifiers (terminal function identifiers), a function to be used between the destination can be specified. Moreover, it is possible to optimize the size of a memory for storing information required for adaptive modulation control.

12 Claims, 14 Drawing Sheets

(56) References Cited

FOREIGN PATENT DOCUMENTS

| | | | |
|---|---|---|---|
| JP | 2004-179853 A | 6/2004 |
| JP | 2004-253914 A | 9/2004 |
| JP | 2004-533792 A | 11/2004 |
| JP | 2005-12683 A | 1/2005 |
| JP | 2005-86818 A | 3/2005 |

\* cited by examiner

| Flag 1 | Flag 2 | Flag 3 | Flag 4 |
|---|---|---|---|
| ~~Localized~~ | SHO on | ~~MIMO Ant=1~~ | ARQ period short |
| ~~Distributed~~ | SHO off | ~~MIMO Ant=2~~ | ARQ period long |
|  |  | ~~MIMO Ant=3~~ |  |
|  |  | ~~MIMO Ant=4~~ |  |

FIG. 8

| Flag 1 | Flag 2 | Flag 3 | Flag 4 |
|---|---|---|---|
| Localized | SHO on | ~~MIMO Ant=1~~ | ~~ARQ period short~~ |
| Distributed | SHO off | ~~MIMO Ant=2~~ | ~~ARQ period long~~ |
|  |  | ~~MIMO Ant=3~~ |  |
|  |  | ~~MIMO Ant=4~~ |  |

FIG. 9

|  | Localized | Distributed |
|---|---|---|
| SHO on | LID=3 | LID=7 |
| SHO off | LID=4 | LID=8 |

FIG. 10

| Flag 1 | Flag 2 | Flag 3 | Flag 4 | Flag 5 | Flag 6 |
|---|---|---|---|---|---|
| Localized | SHO on | MIMO Ant=1 | ARQ timeout short | BPSK R=1/2 | user 10bit |
| Distributed | SHO off | MIMO Ant=2 | ARQ timeout long | BPSK R=3/4 | user 12bit |
| | | MIMO Ant=3 | | QPSK R=1/2 | user 14bit |
| | | MIMO Ant=4 | | QPSK R=3/4 | user 16bit |
| | | | | 16QAM R=1/2 | |
| | | | | 16QAM R=3/4 | |
| | | | | 64QAM R=2/3 | |
| | | | | 64QAM R=3/4 | |

FIG. 16

| Flag 1 | Flag 2 | Flag 3 | Flag 4 | Flag 5 | Flag 6 |
|---|---|---|---|---|---|
| Localized | SHO on | MIMO Ant=1 | ARQ timeout short | BPSK R=1/2 | user 10bit |
| Distributed | SHO off | MIMO Ant=2 | ARQ timeout long | BPSK R=3/4 | user 12bit |
| | | MIMO Ant=3 | | QPSK R=1/2 | user 14bit |
| | | MIMO Ant=4 | | QPSK R=3/4 | user 16bit |
| | | | | 16QAM R=1/2 | |
| | | | | 16QAM R=3/4 | |
| | | | | 64QAM R=2/3 | |
| | | | | 64QAM R=3/4 | |

| Flag 1 | Flag 2 | Flag 3 | Flag 4 | Flag 5 | Flag 6 |
|---|---|---|---|---|---|
| Localized | SHO on | MIMO Ant=1 | ARQ timeout short | ~~BPSK R=1/2~~ | user 10bit |
| Distributed | SHO off | MIMO Ant=2 | ARQ timeout long | ~~BPSK R=3/4~~ | user 12bit |
|  |  | ~~MIMO Ant=3~~ |  | QPSK R=1/2 | user 14bit |
|  |  | ~~MIMO Ant=4~~ |  | QPSK R=3/4 | user 16bit |
|  |  |  |  | 16QAM R=1/2 |  |
|  |  |  |  | 16QAM R=3/4 |  |
|  |  |  |  | ~~64QAM R=2/3~~ |  |
|  |  |  |  | ~~64QAM R=3/4~~ |  |

FIG. 19

| Flag 1 | Flag 2 | Flag 3 | Flag 4 | Flag 5 | Flag 6 |
|---|---|---|---|---|---|
| Localized | ~~SHO on~~ | ~~MIMO Ant=1~~ | ARQ timeout short | ~~BPSK R=1/2~~ | user 10bit |
| Distributed | ~~SHO off~~ | ~~MIMO Ant=2~~ | ARQ timeout long | ~~BPSK R=3/4~~ | user 12bit |
|  |  | ~~MIMO Ant=3~~ |  | ~~QPSK R=1/2~~ | user 14bit |
|  |  | ~~MIMO Ant=4~~ |  | ~~QPSK R=3/4~~ | user 16bit |
|  |  |  |  | ~~16QAM R=1/2~~ |  |
|  |  |  |  | ~~16QAM R=3/4~~ |  |
|  |  |  |  | ~~64QAM R=2/3~~ |  |
|  |  |  |  | ~~64QAM R=3/4~~ |  |

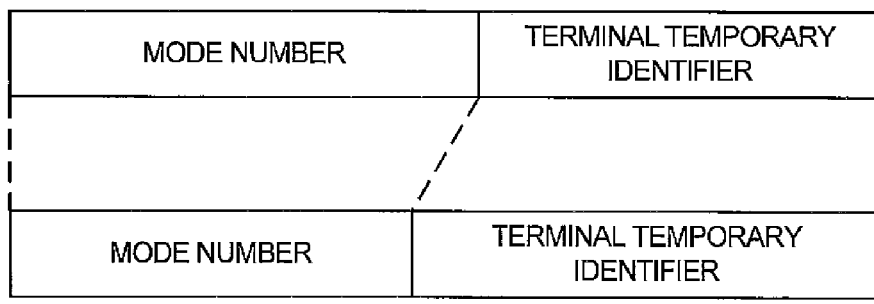

FIG. 20

| Localized | SHO on | MIMO Ant=1 | ARQ timeout short | QPSK R=1/2 | mode=0 |
| Distributed | SHO on | MIMO Ant=1 | ARQ timeout short | QPSK R=1/2 | mode=1 |
| Localized | SHO off | MIMO Ant=1 | ARQ timeout short | QPSK R=1/2 | mode=2 |
| Distributed | SHO off | MIMO Ant=1 | ARQ timeout short | QPSK R=1/2 | mode=3 |
| Localized | SHO on | MIMO Ant=2 | ARQ timeout short | QPSK R=1/2 | mode=4 |
| Distributed | SHO on | MIMO Ant=2 | ARQ timeout short | QPSK R=1/2 | mode=5 |
| .... | | | | | |
| Localized | SHO off | MIMO Ant=2 | ARQ timeout long | 16QAM R=3/4 | mode=62 |
| Distributed | SHO off | MIMO Ant=2 | ARQ timeout long | 16QAM R=3/4 | mode=63 |

FIG. 21

METHOD AND APPARATUS FOR ALLOCATING TERMINAL IDENTIFIERS BASED ON COMMUNICATION FUNCTION

TECHNICAL FIELD

The present invention relates to optimization of information amount required for adaptive modulation control.

BACKGROUND ART

Currently, transfer and access technologies in mobile communication system are rapidly improving such as start of service of the international mobile telecommunication 2000 (IMT-2000). Moreover, technologies such as a high speed down-link packet access (HSDPA) are standardized and data transfer of around 10 Mbps at maximum is expected to be in practical use.

Meanwhile, standardization to realize broadband wireless internet access aiming at 10 to 100 Mbps transfer rate is also being promoted and various techniques have been proposed.

A prerequisite for realizing wireless communication with high speed transfer rate is raising spectrum efficiency. Because there is a proportional relation between the transfer rate and bandwidth to be used, expansion of a frequency bandwidth to be used is a simple solution for raising the transfer rate. However, available frequency bandwidth is tight and it is unlikely that sufficient bandwidth is allocated if a new wireless communication system is constructed. Therefore, it is required to raise spectrum efficiency.

Moreover, another prerequisite is to provide a service in a private area (independent cell) such as wireless LAN seamlessly while realizing service in a communication area configured by a cell such as a mobile phone.

There is a technique called one cell repeat orthogonal frequency division multiplexing/frequency division multiple access (hereinafter referred to as OFDMA) which has a possibility to solve all of the above. This is a technique for carrying out communication in a communication area including a cell by use of the same frequency. Modulation method thereof when communicating is OFDM, while time division multiple access (TDMA) or frequency division multiple access (FDMA) is used as an access method. Needless to say, this is a communication method which enables faster data communication in an independent cell with a wireless interface commonly used with the cell area.

The OFDM and FDMA, which are elemental technology for the OFDMA, will be explained below. The OFDM is a method used for IEEE802.11a which is a wireless system with 5 GHz band or for a digital terrestrial broadcasting. The OFDM is a method by which several tens to thousands of carriers are aligned with a frequency interval, which is theoretically minimum to prevent interference, for simultaneous communication. Normally, the carriers are called sub-carriers in the OFDM and each sub-carrier is digital modulated by phase shift keying (PSK), quadrature amplitude modulation (QAM), or the like to carry out communication. Further, this is regarded as a modulation method strong against frequency selective fading when combined with an error correction method.

The FDMA is a method which accesses by dividing frequency when receiving/transmitting data. Normally in a communication system using the FDMA as an access method, frequency is divided into several bandwidth to divide frequency bandwidth for carrying out communication so that a terminal to be accessed is distinguished. Usually, a protection bandwidth called a guard band is prepared between frequency bandwidths thus divided. However, in the OFDMA, the guard band is not used to prevent damages to spectrum efficiency, or if used, it is a very narrow one with a bandwidth of some sub-carriers.

Moreover, as a method to increase communication efficiency in a multi-channel system such as the OFDMA, there is a method that causes channel quality information (CQI) of each channel to be reported from each terminal to a base station, the base station allocates the best channel to each terminal, and the best modulation method is selected among them so that a user diversity effect can be obtained. This is because in an environment where multipath or fading exists, frequency with better communication quality changes one right after the other and therefore allocating a channel having good characteristics at each time enables the terminal to obtain better communication quality than when a channel is allocated in a fixed manner.

[Patent Document 1] Published Japanese translation of a PCT application No. 2002-539686
[Patent Document 2] Published Japanese translation of a PCT application No. 2004-510358
[Patent Document 3] Japanese Unexamined Patent Publication No. 2004-179853
[Patent Document 4] Japanese Unexamined Patent Publication No. 2004-253914
[Patent Document 5] Published Japanese translation of a PCT application No. 2004-533792
[Patent Document 6] Japanese Unexamined Patent Publication No. 2005-86818

DISCLOSURE OF THE INVENTION

Problem to be Solved by the Invention

In a case where the channel allocation or modulation method is controlled (adaptive modulation control) in response to the CQI, a transmitter side notifies selection information of functions or modulation methods to the receiver side by inserting a flag bit indicating such information into control information and the receiver side understands how to receive information on the basis of the flag bit thus notified. However, in a cashe where a flag bit is used, there occurs a problem that use efficiency of information is worsened if there is deviation in utilization frequency of a specific function on the receiver side. For example, if usage of multi-input-multi-output (MIMO) is controlled by a flag bit, even when a terminal is in motion at high speed and is not in a condition where the terminal can use MIMO, because a flag for controlling MIMO exists in the control information, a bit used for the flag is wasted.

Moreover, in a case where a connection is set (connection is established) or handover by which a base station to be connected is changed occurs, as well as the case of channel allocation or modulation controlling in response to the CQI, quality of a line is measured and the CQI may be transmitted. Even in such a case, because a flag bits are prepared on the transmitter side in response to a function indicating selection information of functions or modulation methods, same problem occurs.

Further, in a wireless communication system including a communication control apparatus (a base station) and a plurality of communication terminal apparatuses (terminals), a number of a terminal temporary identifier for temporarily identifying a communication terminal apparatus or information amount for notifying information required for notifying function to be used varies depending on the number of communication terminal apparatuses connected to the communication controlling apparatus, processing ability of the communication controlling apparatus, requested communication quality, or a condition where the communication terminal is set. However, because a flag bit is fixed to be used, it is difficult to flexibly use the flag bit depending on the communication condition.

The present invention has been made in consideration of the above problems and is aimed at providing a technique to optimize information amount required for adaptive modulation control.

Means for Solving the Problem (1) To achieve the above-mentioned purpose, a communication apparatus according to the present invention is a communication apparatus which allocates a terminal identifier to a destination communication apparatus and carries out communication with the destination communication apparatus by use of a plurality of functions and includes a identifier allocation section for generating and allocating different terminal identifiers corresponding to functions selected from the plurality of functions to be used for communication.

According to the communication apparatus of the present invention, it becomes possible to identify a destination communication apparatus to identify a function selected from the plurality of functions to be used for communication by use of a plurality of different terminal identifiers (terminal function identifiers). Thus, it becomes possible to optimize the size of a memory where information required for adaptive modulation controlling is stored. The communication apparatus prepares a plurality of terminal identifiers for each function (for each combination of functions) selected from the plurality of functions to be used for communication and changes the terminal identifier depending on the function used in communication with the destination communication apparatus. The identifier allocation section is a constituent element to realize a function of an identifier generation section for generating a group of terminal identifiers and a function of allocating the terminal identifiers to the destination communication apparatus and includes a function of an identifier selection section for selecting one terminal identifier from a plurality of terminal identifiers.

(2) Moreover, in the communication apparatus according to the present invention, the terminal identifier at least includes an area which depends on a function.

Thus, since the terminal identifier includes at least an area which depends on a function, it becomes possible to specify a destination communication apparatus and a function.

(3) Further, in the communication apparatus according to the present invention, the identifier allocation section generates and allocates different terminal identifiers corresponding to the destination communication apparatus and a plurality of functions to be used for communication which are selected from the plurality of functions.

Thus, the identifier allocation section generates a terminal identifier corresponding to a function. That is, a terminal identifier (a terminal function identifier) is generated corresponding to each function of one destination communication apparatus. Thus, by the terminal identifier, it becomes possible to specify a destination communication apparatus and a function selected from a plurality of functions and used for communication. The terminal identifier includes, in addition to the function to identify a terminal to be a destination communication apparatus, information for specifying a function that the destination communication apparatus is to use. This is the same as adding an attribute for specifying a function to an identifier which identifies a terminal. Two information is added to a terminal identifier: which function is to be used among a plurality of functions; and which item is to be used among selective items included in a function selected from the plurality of functions to be used for communication. Moreover, as a function selection section selects a function to be used for communication from the plurality of functions as a selection function, it becomes possible to suppress the information amount required for adaptive modulation control.

(4) Further, in the communication apparatus according to the present invention, the identifier allocation section generates a group of terminal identifiers corresponding to a function and allocates a terminal identifier included in the group, which corresponds to the destination communication apparatus and to a function used, to the destination communication apparatus.

Thus, the identifier allocation section can classify a plurality of terminal identifiers (terminal function identifiers) for specifying a destination communication apparatus into groups and allocate a function to each group. Thus, the terminal identifier can specify a destination communication apparatus and a selective item of a function to be used.

(5) Further, in the communication apparatus according to the present invention, the plurality of functions include at least one of: types of modulation method, coding rate, stream number of MIMO (Multi Input Multi Output) communication, number of antennas used for MIMO communication, types of automatic repeat request (ARQ), number of institutionalized communication apparatuses, and notification method of the CQI (channel quality information).

Thus, enabling to select a plurality of functions which are not used depending on the communication condition, it becomes possible to suppress the information amount for adaptive modulation control.

(6) Further, in the communication apparatus according to the present invention, a function selecting section for selecting a predetermined number of functions to be used for communication is further included and the identifier allocation section generates and allocates a terminal identifier to the destination communication apparatus on the basis of the selected function.

Thus, the function selecting section can select a selection function on the basis of communication condition. Therefore, it becomes possible to more appropriately select the selection function and to optimize the information amount required for adaptive modulation control.

(7) Further, in the communication apparatus according to the present invention, the function selecting section limits the number of functions to be used on the basis of at least one of: number of destination communication apparatuses to be connected, requested communication quality, and information received from the destination communication apparatus.

Thus, the function selecting section can limit the number of functions to be selected depending on the processing ability of the destination communication apparatus on the basis of at least one of: number of destination communication apparatuses to be connected, requested communication quality, and information received from the destination communication apparatus. Therefore, it becomes possible to more appropriately select the selection functions and to optimize the information amount required for adaptive modulation control.

(8) In the communication apparatus according to the present invention, the function selecting section selects a function to be used on the basis of at least one of: the number of destination communication apparatuses to be connected, requested communication quality, and information received from the destination communication apparatus.

Thus, the function selecting part can change the functions to be selected depending on the processing ability of the destination communication apparatus on the basis of at least one of: number of destination communication apparatuses to be connected, requested communication quality, and information received from the destination communication apparatus. Therefore, it becomes possible to select a selective function depending on the communication condition.

(9) Further, a communication apparatus according to the present invention is a communication apparatus which allocates a terminal identifier to a destination communication apparatus and carries out communication with the destination communication apparatus by utilizing a plurality of functions, wherein the terminal identifier includes at least an area which depends on the function, wherein the area which depends on the function includes an identifier allocation section for generating different terminal identifiers corresponding to a plurality of functions selected from the plurality of functions and used for communication and for allocating the identifiers to the destination communication apparatus.

Thus, since the terminal identifier includes an area (mode number) which depends on a function, it becomes possible to specify a destination communication apparatus and a function.

(10) Moreover, in the communication apparatus according to the present invention, the terminal identifier includes a terminal temporary identifier which temporarily identifies a terminal while the area which depends on the function includes mode numbers corresponding to each of a plurality of combinations of a plurality of functions.

According to this configuration, it becomes possible to efficiently use a memory for a terminal function identifier which is a combination of a terminal temporary identifier and a mode number depending on the condition of the communication apparatus. Moreover, it becomes possible to optimize utilization condition of a memory depending on the condition of the communication apparatus. Further, it becomes possible to reduce the amount of memory allocated to a terminal function identifier because utilization condition of the memory can be changed depending on the condition of the communication apparatus.

(11) Further, in the communication apparatus according to the present invention, the identifier allocation section determines the size of area which depends on the function on the basis of at least one of: number of destination communication apparatuses to be connected, requested communication quality, and information received from the destination communication apparatus.

Thus, the identifier allocation part can flexibly change the size of the area which depends on the function depending on the communication condition. Therefore, it becomes possible to use a memory depending on the communication condition and to optimize information amount required for adaptive modulation control. Moreover, since allocation of memory can be changed depending on the communication condition, it becomes possible to suppress memory amount as a whole.

(12) In the communication apparatus according to the present invention, the identifier allocation section further includes a transmission section for generating function corresponding information corresponding functions correlated with a plurality of terminal identifiers thus generated and the terminal identifiers and for transmitting the function corresponding information thus generated to a destination communication apparatus.

Thus, by notifying the function corresponding information to the destination communication apparatus, the destination communication apparatus can obtain information specifying a function added to the terminal identifier (terminal function identifier). The identifier allocation section transmits the function corresponding information thus generated to the destination communication apparatus through the transmission section for notification to the destination communication apparatus.

(13) A communication method according to the present invention is a communication method to allocate a terminal identifier to a destination communication apparatus and to carry out communication with the destination communication apparatus by use of a plurality of functions, wherein different terminal identifiers are generated for each of function used and are allocated to the destination communication apparatus.

According to the communication method of the present invention, it becomes possible to specify a destination communication apparatus and a function to be used by use of a plurality of different terminal identifiers (terminal function identifiers). Thus, it becomes possible to optimize the size of a memory where information required for adaptive modulation controlling is stored.

Advantageous Effect of the Invention

According to the present invention, it becomes possible to optimize the information amount required for adaptive modulation control.

BRIEF DESCRIPTION OF THE DRAWINGS

[FIG. 8] A view showing an example of partially selecting a function for use.

[FIG. 9] Another view showing an example of partially selecting a function for use.

[FIG. 10] A view showing an example of a case where a combination of selective items of functions are allocated to a terminal function identifier.

[FIG. 16] A view showing an example of a function controlled by the communication control apparatus in the third embodiment.

[FIG. 17] A view showing an example of a utilization condition of a memory in a function prioritized condition.

[FIG. 18] A view showing an example of a utilization condition of a memory in a function limited condition.

[FIG. 19] A view showing an example of a utilization condition of a memory in a terminal number prioritized condition.

[FIG. 20] A view showing an example of utilization ratio of a memory for a terminal function identifier.

[FIG. 21] A view showing an example of allocation of a mode number in the case of function limited condition shown in FIG. 18.

Figure 1:
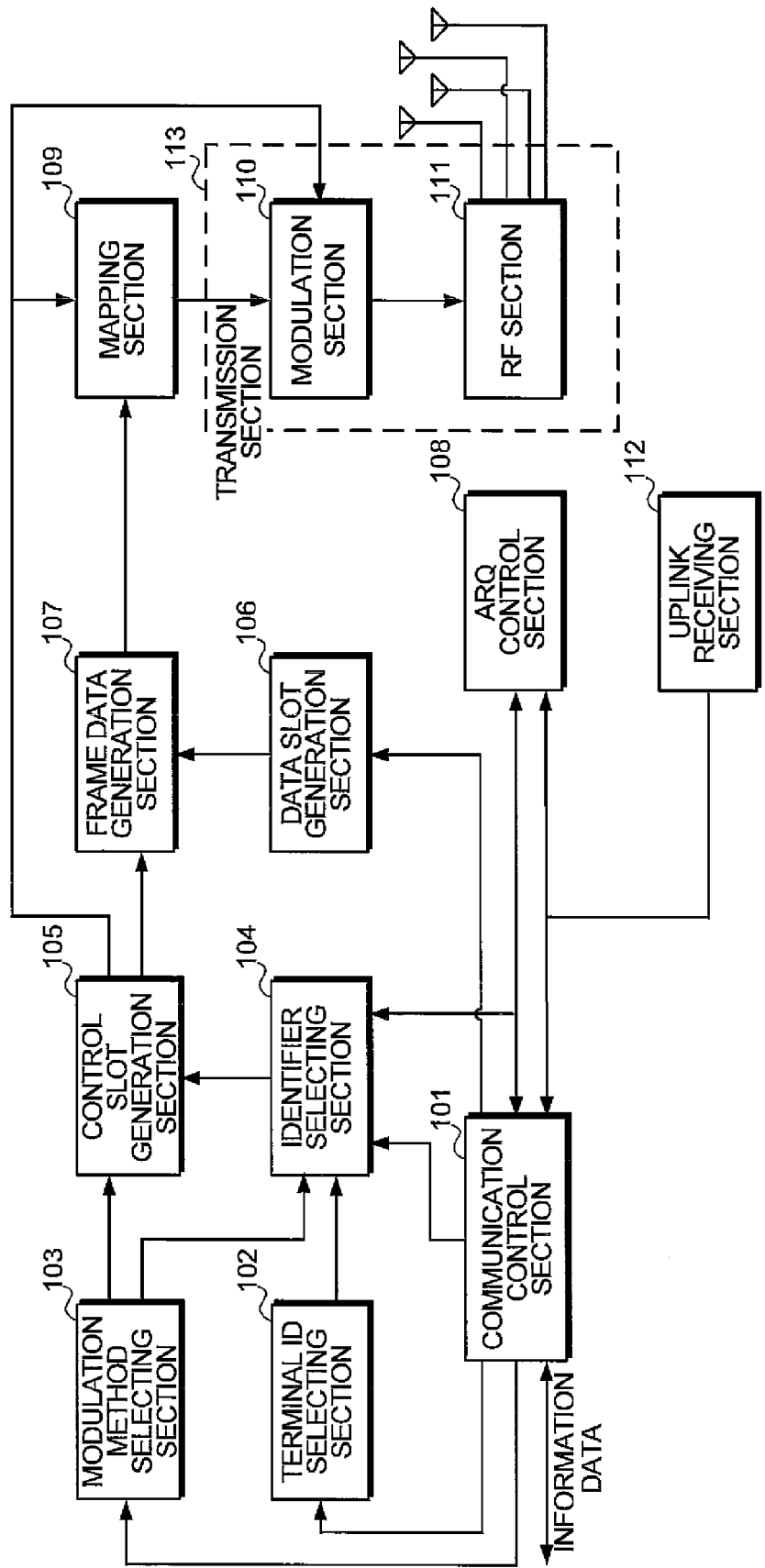
[FIG. 1] A block diagram showing a configuration example of a communication control apparatus of a first embodiment.

DESCRIPTION OF THE REFERENCE NUMERALS 100,300: Communication control apparatus;
101,301: Communication control section;
102: Terminal ID selecting section;
103: Modulation method selecting section;
104,304: Identifier selecting section;
105: Control slot generation section;
106: Data slot generation section;
107: Frame data generation section;
108: AQR control section;
109: Mapping section;
110: Modulation section;
111: RF section;
112: Uplink receiving section (receiver);
113: Transmission section;
114,305: Identifier allocation section;
151,302: Function selecting section;
152,303: Identifier generation section;
153: Function corresponding information management section;
161: First selecting section;
162: Second selecting section;
163: Logical identifier selection section;
200,400: Communication terminal apparatus;
201,401: Communication control section;
202: RF section;
203: Control slot demodulating section;
204: Data slot demodulating section;
205: CQI measuring section;
206: ARQ control section; and
207: Uplink transmission section

BEST MODE FOR CARRYING OUT THE INVENTION

Next, embodiments of the present invention will be explained with reference to figures. Same reference numeral is denoted to a constituent element having same configuration or a function or to a part equivalent thereto and explanation thereof is omitted.

The present invention can be applied to a wireless communication system including a communication apparatus for transmitting data by adaptive modulation, a communication apparatus for receiving adaptive modulation data, and to a communication apparatus included in a wireless communication system. In the explanation below, it is assumed that a communication apparatus which controls adaptive modulation and transmits data is a communication control apparatus and a communication apparatus which receives adaptive modulation controlled data is a communication terminal apparatus for easy of explanation. However, the present invention can be applied to a communication apparatus which uses adaptive modulation control communication method and carries out communication with a communication apparatus on a destination side (destination communication apparatus) by use of a plurality of functions having a plurality of selective items. Moreover, a communication terminal apparatus may be referred to as a "terminal".

In the present application, following terms are used for explanation. The adaptive modulation control is a notion which is executed in a case where channel allocation or modulation method is controlled in response to CQI, a case where the communication controlling apparatus establishes connection upon start of communication with a communication terminal apparatus, a case of handover where a communication terminal apparatus changes a communication controlling apparatus (base station), and the like.

It is a prerequisite that a communication apparatus selects at least one from a plurality of functions having a plurality of selective items and uses one selective item of the selected function to carry out communication with a destination communication apparatus. The plurality of functions include at least one of: types of modulation method, coding rate, stream number of MIMO communication, number of antennas used for MIMO communication, types of automatic repeat request (ARQ), number of institutionalized communication apparatuses, and notification method of the CQI.

A terminal unique identifier is a unique identifier of a terminal and is also referred to as a physical identifier. The terminal temporary identifier is an identifier temporarily allocated to a terminal and also referred to as a logical identifier. It is an identifier added by the terminal controlling apparatus and is added to the terminal every time the communication terminal apparatus establishes connection with the communication control apparatus.

A terminal function identifier is a temporary identifier for correlating a destination communication apparatus and a function used for communication and is generated by the communication control apparatus. Moreover, in the present application, a terminal identifier is a wide notion including a terminal unique identifier, a terminal function identifier, and other identifiers for identifying a destination communication apparatus.

Further, in the following explanation will be given using downlink in the OFDMA system (communication from a base station to a mobile station). However, the present invention can be applied to a case of uplink.

First Embodiment

In a first embodiment, a case will be explained where a terminal function identifier to which attribute of a function to be used in communication between a communication control apparatus and a communication terminal apparatus is added is used as a terminal temporary identifier.

FIG. 1 is a block diagram showing a configuration example of a communication control apparatus 100 of the first embodiment.

A communication control section 101 is in charge of information data through a backbone handled by the communication control apparatus 100 or control of each block of the communication control apparatus 100. Moreover, the communication control section 101 generates a plurality of terminal function identifiers and includes a function corresponding information for specifying correspondence between the plurality of terminal function identifiers and functions. This will be explained later using FIG. 3.

A terminal ID selecting section 102 is instructed a destination communication apparatus (communication terminal apparatus) to which the terminal ID selecting section 102 is to transmit data by the communication control section 101 and outputs a terminal unique identifier of the communication terminal apparatus as terminal ID information. The terminal ID selecting section 102 may output a terminal function identifier instead of the terminal unique identifier as the terminal ID information. This is enabled in a case where a terminal function identifier is already allocated to a communication terminal apparatus on the communication destination side and the communication control section 101 acquires the terminal function identifier.

A modulation method selecting section 103 selects a modulation method including a modulation method, an coding method, ON/OFF of soft handover control, and MIMO, and outputs the modulation method thus selected as modulation method information according to an instruction from the communication control section 101.

An identifier selecting section 104 selects one from a plurality of selective items of a selection function according to an instruction from the communication control section 101 and selects a terminal function identifier correlated with the selected selective item. Specifically, on the basis of terminal ID information (a terminal unique identifier or terminal function identifier), a modulation method information, ARQ control information indicating a type of selected ARQ, or the like of the communication terminal apparatus to be a destination, a terminal function identifier corresponding to a selective item of a function to be used is selected from a plurality of terminal function identifiers. Details will be described later using FIG. 4.

A control slot generation section 105 generates control slot data from the selected terminal function identifier and modulation method. A data slot generation section 106 processes information data according to an instruction from the communication control section so that the data has appropriate length and adds an ARQ control signals and an error detection signal.

A frame data generation section 107 assembles a frame from the control slot data thus generated and data of data slot. An ARQ control section 108 carries out control of ARQ by signals from the communication control section 101 and an uplink receiving section 112. Control result is outputted as ARQ control information.

A mapping section 109 determines which data is to be allocated to each sub-carrier according to a generated packet and selected modulation method. A modulation section 110 carries out modulation processing on the basis of mapping result of data and modulation method.

An RF section 111 converts modulation signal into transmission frequency from an antenna, amplifies to required transmission power, and transmits converted modulation signal. The RF section 111 includes a plurality of antennas. The uplink receiving section (receiver) 112 receives an uplink signal from the communication terminal apparatus. A transmission section 113 includes a function to transmit data to the destination communication apparatus and includes the modulation section 110 and the RF section 111 in FIG. 1.

Figure 2:
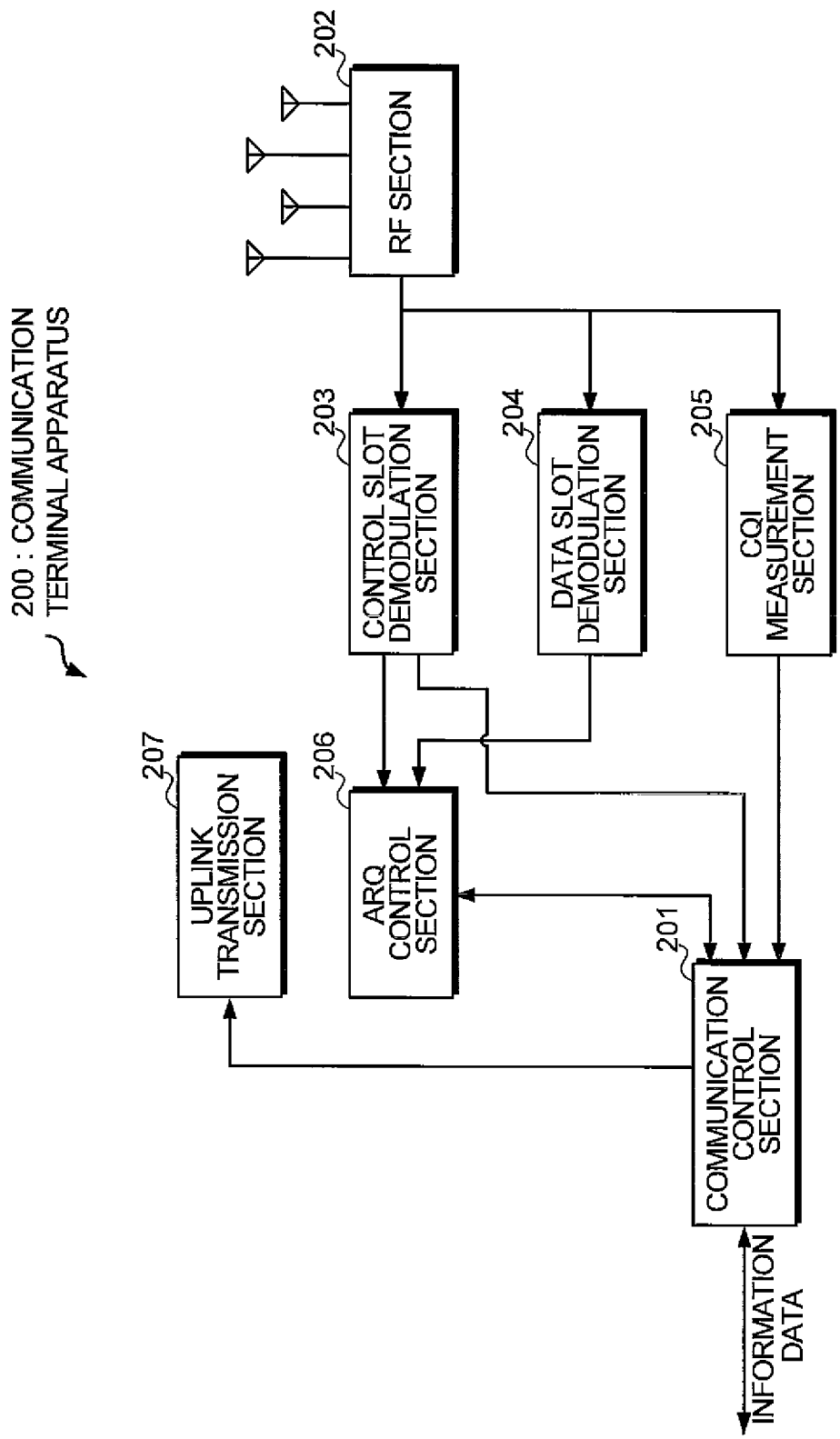
[FIG. 2] A block diagram showing a configuration example of a communication terminal apparatus of a first embodiment.

FIG. 2 is a block diagram showing a configuration example of a communication terminal apparatus 200 of the first embodiment. A communication control section 201 is in charge of communication control in the communication terminal apparatus 200. Moreover, the communication control section 201 judges attribute of a function added to a terminal function identifier and understands what type of adaptive modulation control is carried out on the communication control apparatus 100 side.

An RF section 202 takes a necessary signal from received signals and converts the signal into a baseband signal. A control slot demodulating section 203 demodulates a control slot. A data slot demodulating section 204 demodulates following data slot on the basis of demodulation result of the control slot.

A CQI measuring section 205 generates quality information of each sub-channel, CQI, and the like from a received signal. An ARQ control section 206 judges which slot can be received and which slot cannot be received from the demodulated data slot and generates an ARQ control signals to be transmitted to the communication control apparatus 100. An uplink transmission section 207 transmits data to the communication control apparatus 100.

Figure 3:
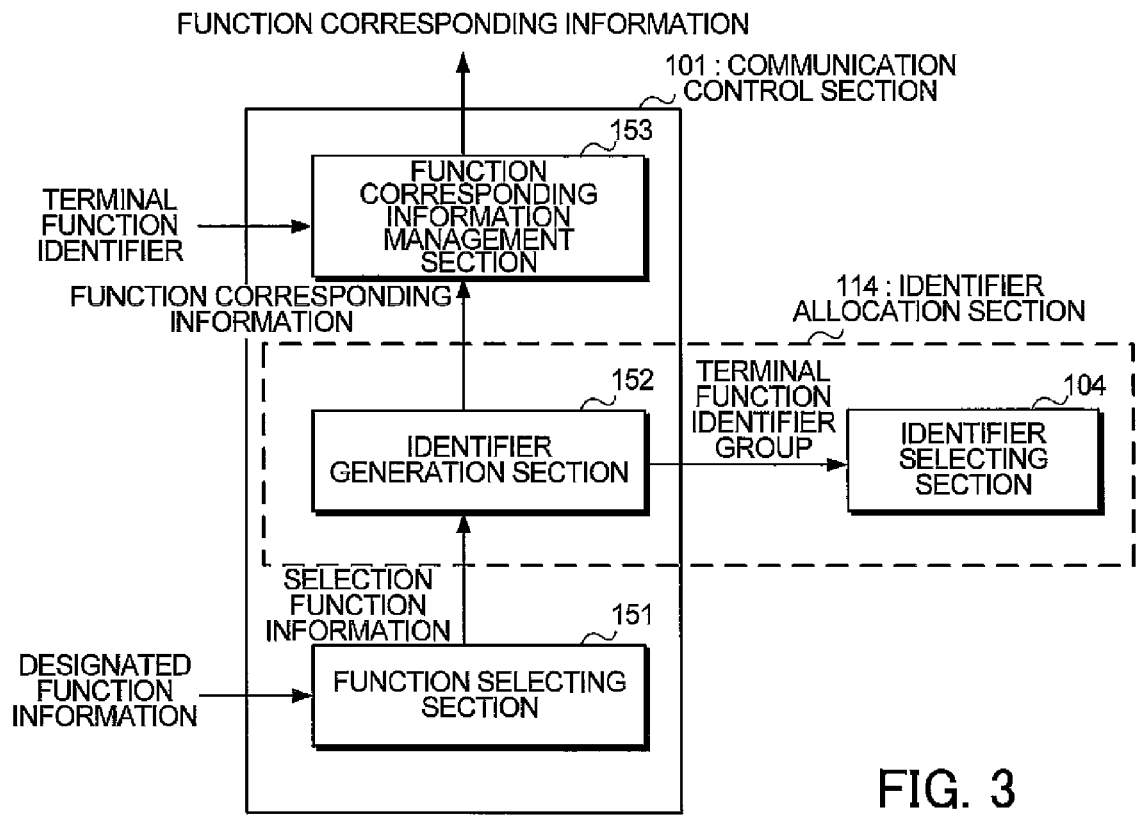
[FIG. 3] A block diagram showing an example of configuration regarding generation of a terminal function identifier and an identifier allocation section among functions of a communication control section of the first embodiment.

FIG. 3 is a block diagram showing an example of configuration regarding generation of a terminal function identifier and an identifier allocation section 114 among functions of the communication control section 101 of the communication control apparatus 100 of the present embodiment. Moreover, the communication control section 101 includes a function selecting section 151, an identifier generation section 152, and a function corresponding information management section 153 as constituent elements regarding generation of a terminal function identifier. Further, an identifier allocation section 114 has a function to generate different terminal identifiers (terminal function identifiers) for functions used and to allocate the identifiers to the destination communication apparatus. In FIG. 3, an example which is realized by the identifier generation section 152 and the identifier selection section 104 (including the identifier generation section 152 and the identifier selection section 104) is shown.

The function selecting section 151 inputs designated function information notified by the communication terminal apparatus 200, selects at least one function from a plurality of functions on the basis of inputted designated function information, processing ability of the communication control apparatus 100, and communication condition (traffic condition, quality of a propagation channel, requested communication quality, and the like) to determine a selection function, and outputs the selection function thus determined as selection function information. The designated function information is information generated by the communication control section 201 of the communication terminal apparatus 200 and designates a function in a case where the selective items that a plurality of functions have is changeable and a function when a fixed value is used. Moreover, the function selecting section 151 can select an appropriate function as a selective function on the basis of other factors such as communication condition or ability of the communication control apparatus 100 even if the function is designated by the designated function information. Further, the function selecting section 151 can adjust the number of functions selected as selection functions. Generated selection function information is outputted to the identifier generation section 152.

Here in FIG. 3, a case where designated function information is notified from the communication terminal apparatus 200 is shown. However, selection function may be selected in the communication control apparatus 100 without notice of the designated function information from the communication terminal apparatus 200.

The identifier generation section 152 generates a plurality of different terminal function identifiers. Specifically, the identifier generation section 152 generates terminal function identifiers on the basis of selection function information selected by the function selecting section 151. Specifically, the identifier generation section 152 generates a plurality of terminal function identifiers specifying each of a plurality of selection functions that the selective function has for each of the communication terminal apparatus 200. In a case where there are a plurality of selection functions, a plurality of terminal function identifiers which specify combinations of a plurality of selective items that each of the plurality of selective functions has are generated. Moreover, the identifier generation section 152 generates function corresponding information which corresponds the selective items correlated with each of a plurality of generated terminal function identifiers and the terminal function identifiers. Specific examples of the terminal function identifier and the function corresponding information will be described later using FIG. 10. The identifier generation section 152 generates function corresponding information for each of communication terminal apparatuses 200 to be connected. The function corresponding information thus generated is outputted to the function corresponding information management section 153.

The function corresponding information management section 153 includes a saving area for saving function corresponding information generated by the identifier generation section 152, stores the function corresponding information in the saving area, and manages it. Moreover, the function corresponding information management section 153 receives notification of a terminal function identifier and outputs function corresponding information of the notified terminal function identifier.

Figure 4:
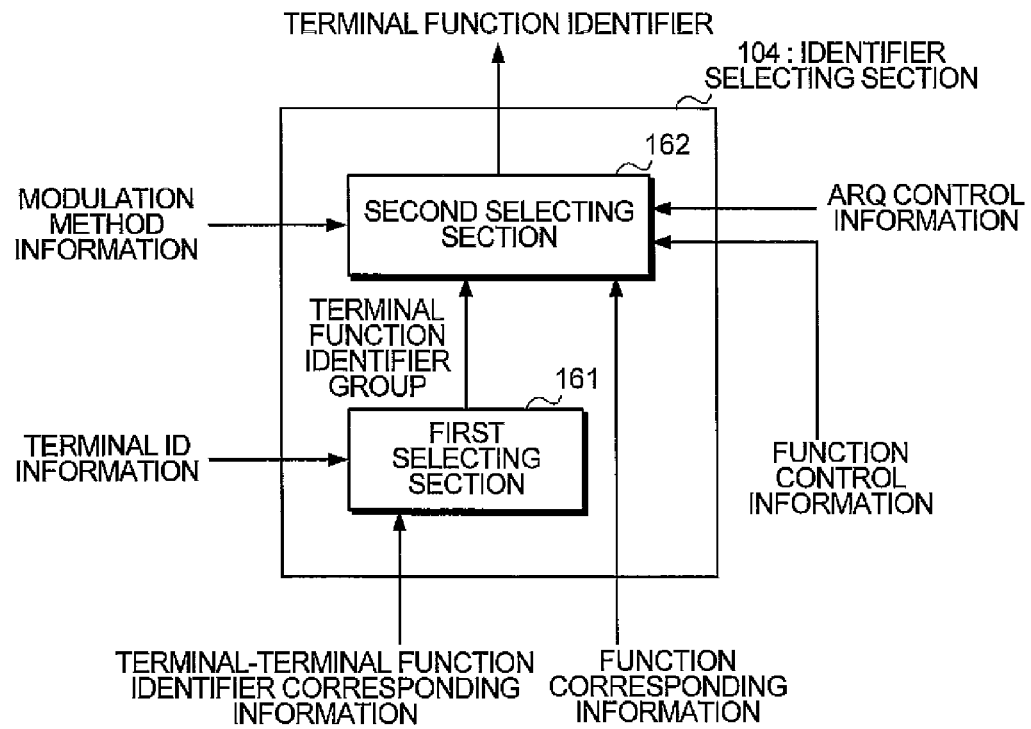
[FIG. 4] A block diagram showing a configuration example of an identifier selecting section of the first embodiment.

Next, the identifier selecting section 104 will be explained. FIG. 4 is block diagram showing a configuration example of an identifier selecting section of the present embodiment. The identifier selecting section 104 includes a first selecting section 161 and a second selecting section 162. The first selecting section 161 inputs terminal ID information from the terminal ID selecting section 102 and inputs terminal-terminal function identifier information from the communication control section 101. The terminal-terminal function identifier information corresponds a terminal unique identifier and a plurality of terminal function identifiers. In the present embodiment, because a plurality of terminal function identifiers are allocated to one communication terminal apparatus 200, a plurality of terminal function identifiers correspond to a terminal unique identifier. The first selecting section 161 selects a plurality of terminal function identifiers allocated to the communication terminal apparatus 200 on the basis of the terminal ID information and the terminal-terminal function identifier. In a case where one of the terminal function identifiers is notified as the terminal ID information, the first selecting section 161 searches for a terminal unique identifier corresponding to the notified terminal function identifier and selects a plurality of terminal function identifiers (terminal function identifier group) corresponding to the searched terminal unique identifier. The selected terminal function identifier group is outputted to the second selecting section 162.

The second selecting section 162 selects one terminal function identifier from the terminal function identifier group notified from the first selecting section 161 on the basis of modulation method information notified from the modulation method selecting section 103, ARQ control information notified from the ARQ control section 108, and function controlling information notified from the communication control section 101. The function control information is information generated by the communication control section 101 for controlling a function to be used on the basis of receiving quality information or the like notified by the communication terminal apparatus 200 and specifies which selective item of a plurality of selective items that the function has is to be used. The function control information includes, for example, control information such as ON/OFF of soft handover.

Figure 5:
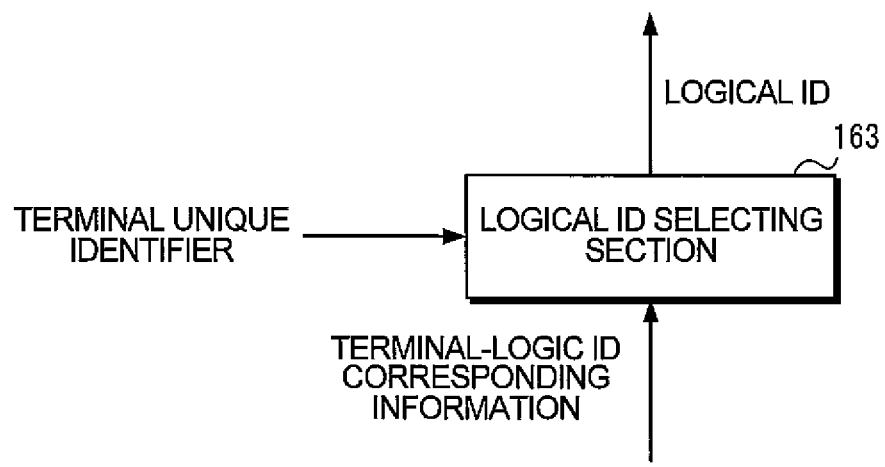
[FIG. 5] A block diagram showing a configuration example of a conventional logical identifier selecting section.

Here, a difference from a conventional method will be explained. FIG. 5 is a block diagram showing a configuration example of a conventional logical identifier selection section 163. Conventionally, the communication terminal apparatus 200 and a terminal temporary identifier (logical identifier) are in one-to-one relation and therefore a logical identifier is determined on the basis of a terminal unique identifier and terminal-logical identifier corresponding information.

Here in FIG. 4, an example where the identifier selection section 104 includes two selection sections for selecting a terminal function identifier is shown. However, this is a configuration shown for easy of comparison with the conventional example of FIG. 5 and the identifier selection section 104 may include one selection section and all the information may be inputted at a time to determine a terminal function identifier. The identifier selection section 104 may be provided in the communication control section 101 or may be a part of function executed by the communication control section 101. Further, each constituent element provided in the communication control section 101 shown in FIG. 3 may be provided in other locations and may not be limited within the communication control section 101.

Figures 6, 7:
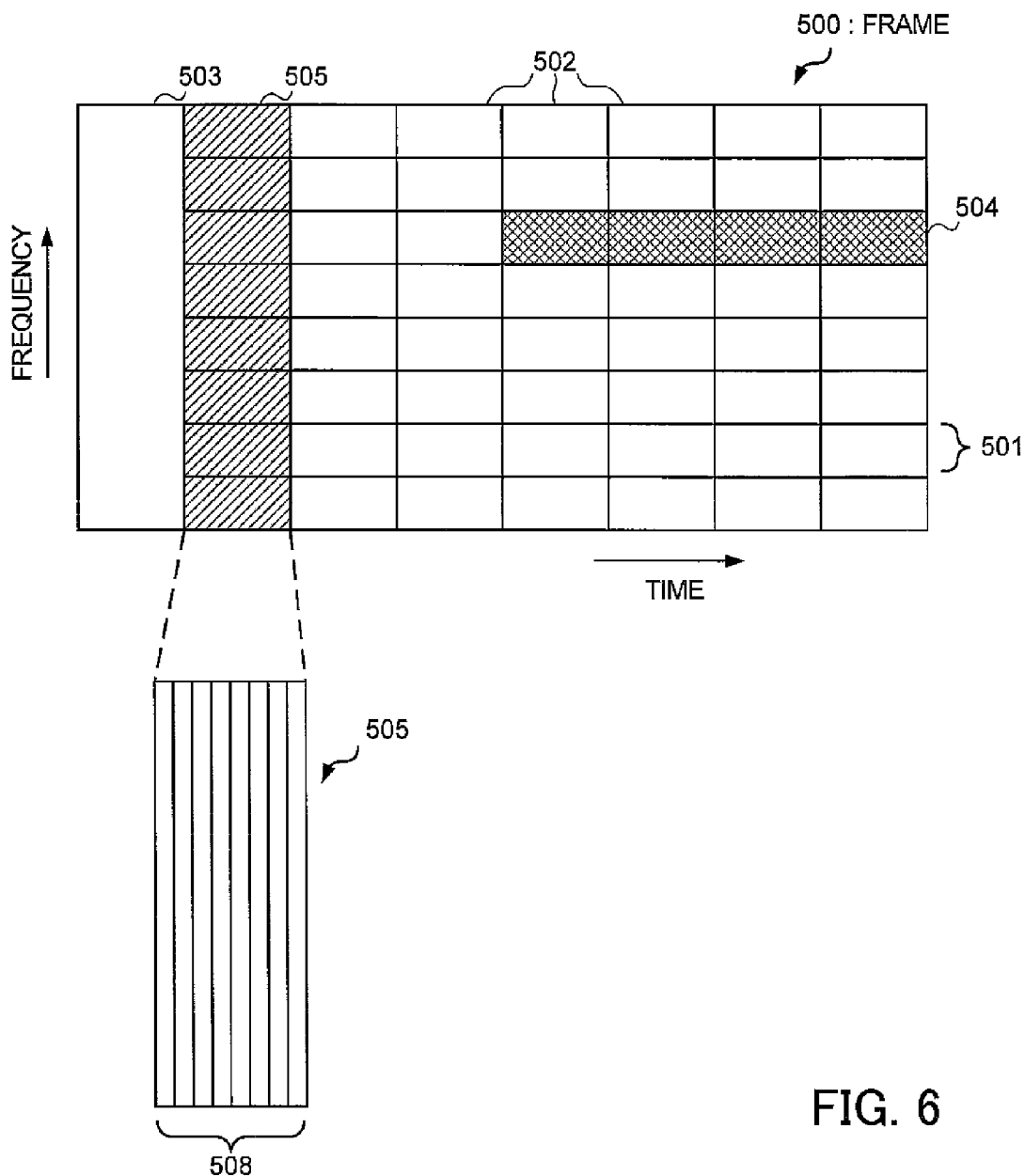
[FIG. 6] A view showing an example of a frame used for an OFDMA system.
[FIG. 7] A view showing an example of a function for allocation to a terminal function identifier in the first embodiment.

Next, form of data transmitted and received between the communication control apparatus 100 and the communication terminal apparatus will be explained. FIG. 6 is a view showing an example of a frame used for an OFDMA system. A frame 500 includes a plurality of slots 502 determined by a predetermined time length and a predetermined frequency bandwidth. The OFDMA is an FDMA system utilizing an OFDM and carries out management of resources by the section of a sub-channel 501, which is a divided sub-carrier in a predetermined frequency bandwidth. Depending on the condition, management is carried out by the section of a slot 502 which is generated by further dividing the sub-channel 501 in time direction. In the present embodiment, an example where the slot 502 is a minimum section for management of resources will be explained. Moreover, to carry out management of the slot 502, management will be carried out by the section of the frame 500 with a fixed length that includes a predetermined number of slots 502. At the top of the frame 500, allocation information of following slot group 502 and a control slot 503 for control of storing modulation methods of each of slots 502 are provided, followed by slots 502 for data. The control slot 503 is an area with its usage previously determined for control information in the frame 500. The control slot 503 is transmitted by a predetermined modulation method, for example, binary phase shift keying (BPSK) which can ensure the reliability most, and following slots 502 for data are transmitted by the modulation method that follows the content of the control slot 503.

As a policy applied when allocating slots 502 for data to each of communication terminal apparatuses 200, a method called "localized" which allocates a slot 502 to a communication terminal apparatus 200 in sub-channel direction, that is, time axis (a method to allocate a checkered area 504) or a method called "distributed" which allocates a slot 502 in frequency axis (a method to allocate shadowed area 505) is used. Localized utilizes CQI reported by a communication terminal apparatus 200 and enables to increase user diversity gain by allocating a sub-channel having good characteristics for the communication terminal apparatus 200 to a slot, while the distributed enables to obtain frequency diversity effect by the allocated slot.

Which allocation policy is to be used is not directly related to the present invention. However, as an example, the localized may be used when moving speed of the communication terminal apparatus 200 (mobile terminal) is not so fast and accuracy of the CQI can be sufficiently ensured, while the distributed may be used when moving speed of the communication terminal apparatus 200 is fast and accuracy of the CQI cannot be sufficiently ensured. Moreover, it is conceivable that the distributed may be used for a communication terminal apparatus 200 having extremely low transmission frequency and low needs to report the CQI such as a remote sensor.

In the present embodiment, the area 505 of the distributed is further divided in time axis so that information amount for each slot becomes the same as the case of the localized. In the present embodiment, a localized slot is divided into eight in frequency axis. Therefore, a distributed slot is also divided into eight in time axis. A reference numeral 508 indicates length of one slot in time axis and the length indicated by the reference numeral 508 is divided into eight.

Next, function used between the communication control apparatus 100 and the communication terminal apparatus 200 and a procedure for allocating the function to a terminal function identifier will be explained. In the communication between the communication control apparatus 100 and the communication terminal apparatus 200, a plurality of functions are used and each of the plurality of functions has a plurality of selective items. One selective item is selected for use for each of the plurality of functions. Therefore, if one function is selected for use, the communication control apparatus 100 selects one from a plurality of selective items of the selected function. Moreover, if a plurality of functions are used, the communication control apparatus 100 selects one from the combined number of selected items of the selected functions.

FIG. 7 is a view showing an example of a function for allocation to a terminal function identifier. Each of the functions shown in FIG. 7 has selective items for selecting a type of the function. In the present embodiment, a case where four functions are used is taken as an example and in FIG. 7, each function is shown by using Flags 1 to 4. In FIG. 7, an example where function of Flag 3 has four selective items and other functions in other Flags have two selective items is shown. The example shows a case where Flag 3 requires a 2-bit flag bit and the other Flags require 1-bit flag bit to transfer selective items (information) of a function to be used. Therefore, in the present embodiment, the four functions are allocated to a terminal function identifier (attributes of the four functions are added to a terminal temporary identifier).

Each of the functions indicates the following: First function is for switching localized/distributed shown in Flag 1; Second function is for switching ON/OFF of soft handover in Flag 2; Third function is for the number of transmission antennas of MIMO shown in Flag 3; and Fourth function is for switching long/short of timeout period of ARQ shown in Flag 4. Because each function does not have a relation with the essence of the present invention, explanation will be given briefly.

Regarding the localized and distributed, explanation has been given in FIG. 6. Soft handover is a technique to prevent temporary disconnection in handover where a connection host moves from cell or a sector to another cell or a sector by connecting with both cells or sectors at a border and to prevent unstable communication at the border. Although it differs depending on the method, to realize soft handover, it is required to operate at least a plurality of functions on the receiver side. Therefore, it may cause increase in circuit size or power consumption.

MIMO uses a plurality of antennas on both the transmitter and receiver sides: a transmitter transmits a plurality of signals from different antennas simultaneously; and a receiver receives the signals by use of the plurality of antennas and separates each of transmission signals from the received signals by signal processing. Therefore, depending on the condition of a propagation channel between transmitter and receiver sides, number of signals which can be separated differs.

Time out period of ARQ is related to real time property of information. If the time out period is set long, reliability of information rises but real time property is lowered. If the time out period is set short, reliability of information is lowered but real time property rises.

To control all of these functions during communication, 5-bit information is required. However, not all the communication terminal apparatuses 200 need to switch these functions. FIGS. 8 and 9 show an example where part of functions are selected and used. For example, a communication terminal apparatus 200 which moves at a high speed does not use MIMO and depending on the moving speed, it is preferable that the apparatus uses only the distributed. In such a case, as shown in FIG. 8, it is sufficient that information of Flags 2 and 4 are notified to the communication terminal apparatus 200 and information of Flags 1 and 3 do not need to be notified. Moreover, in a low bit-rate communication such as an ordinary verbal communication, MIMO is not used and the ARQ timeout period is set to "short" and not switched. In this case, as shown in FIG. 9, information of Flags 1 and 2 may be notified to the communication terminal apparatus 200. Further, though not shown in the figures, there may be a case where a communication terminal apparatus 200 used as a remote sensor (mobile terminal) does not actually move. In such a case, distributed, no soft handover, no MIMO, and "long" as ARQ timeout period are set and the parameters are not changed during communication. As described above, in such cases, 5-bit information amount for function selection is not efficiently used. The present invention is for solving this problem.

In the present embodiment, a terminal function identifier of a communication terminal apparatus 200 which can be dynamically attached is used for selection of these functions and for distinction instead of the flag bit and notification to the communication terminal apparatus 200 is made. The terminal temporary identifier (logical identifier) of the communication terminal apparatus 200 is an ID (identifier) allocated temporarily when the communication terminal apparatus 200 is connected with the communication control apparatus 100 and is used for reduction of information amount when the bit length of the terminal unique identifier (physical identifier) uniquely allocated to the communication terminal apparatus 200 is long. Generally, one terminal temporary identifier is allocated to one communication terminal apparatus 200 and at most, a few multicast addresses are allocated. In the present embodiment, a terminal function identifier which correlates the terminal temporary identifier with the function is generated and the terminal function identifiers for the number of combination of functions used by the communication terminal apparatus 200 (number of combination of selective items each function has) are allocated.

Allocation of a terminal function identifier will be explained by use of FIG. 10. FIG. 10 is a view showing an example of a case where a combination of selective items of functions are allocated to a terminal function identifier. Here, a case where functions shown in FIG. 9 are selected among functions shown in FIG. 7 is taken as an example for explanation. In FIG. 10, a case where only switching localized/distributed and switching in soft handover are used and fixed values are used for other functions is shown. To allow these two functions to be switched, there are four patterns of combination as shown in FIG. 10 and a terminal function identifier is allocated to each of the combination. As shown in FIG. 10, the allocated terminal function identifier may not be continuous values. As described above, the example shown in FIG. 10 is a case where two functions are selected, there are four patterns of combination of selective items of the selected two functions, and four terminal function identifiers are generated. FIG. 10 shows function corresponding information that specifies function corresponding to four terminal function identifiers.

Figure 11:
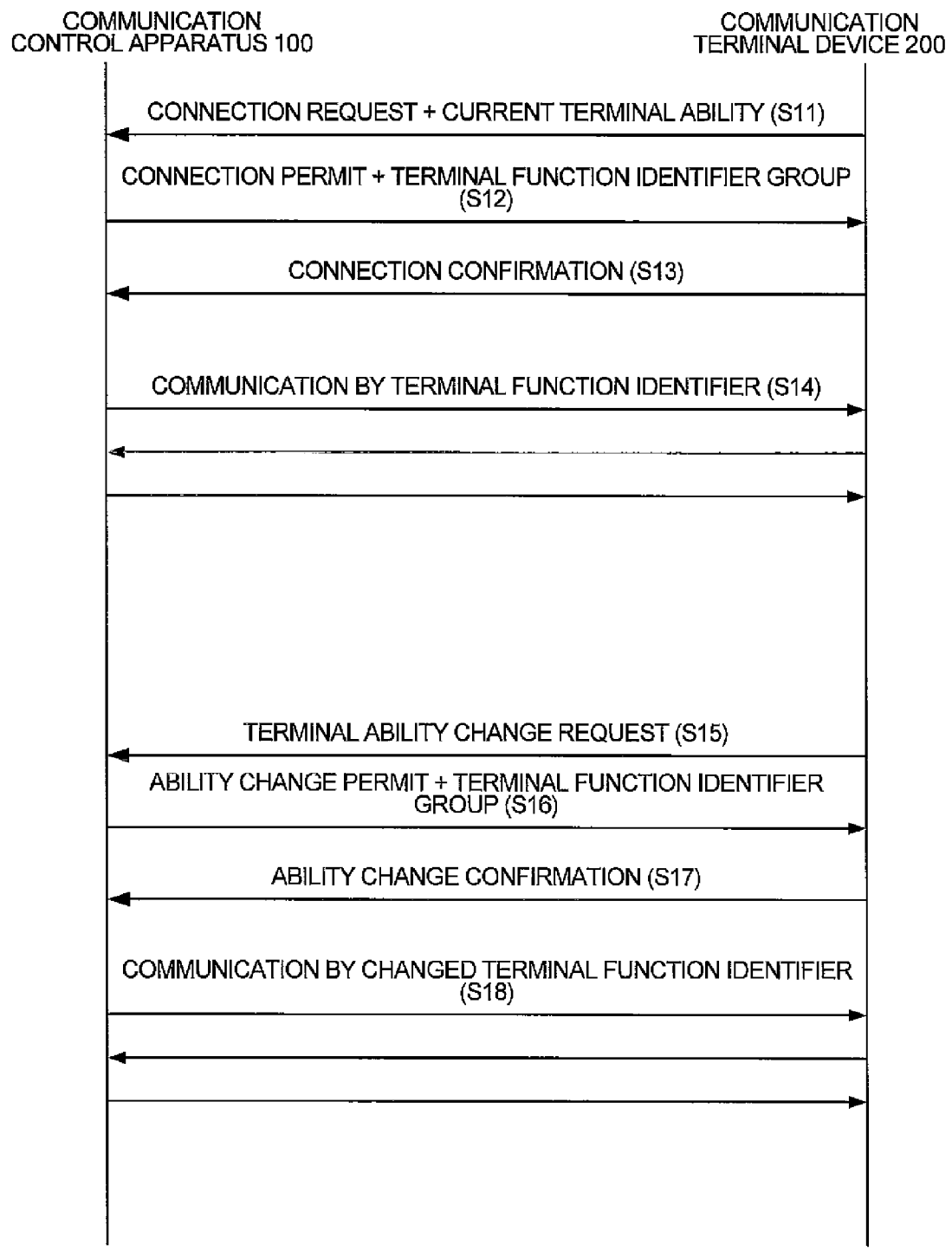
[FIG. 11] A sequence diagram showing an example of a flow of processing between the communication control apparatus and a communication terminal apparatus.

Next, an example of a procedure for allocating functions and a terminal function identifier to the communication terminal apparatus 200 will be shown. FIG. 11 is a sequence diagram showing an example of a flow of processing between the communication controlling apparatus 100 and the communication terminal apparatus 200. First, the communication terminal apparatus 200 carries out connection request to the communication control apparatus 100 (S11). At this time in the communication terminal apparatus 200, the communication control section 201 generates a function to enable switching of function depending on the communication condition by allowing switching and a function to use a fixed value without switching a function as designated function information and the communication terminal apparatus 200 notifies the designated function information as current terminal ability to the communication control apparatus 100.

The communication control apparatus 100 receives the connection request and transmits connection permit to the communication terminal apparatus 200 which made the connection request (S12). At this time in the communication control apparatus 100, the function selecting section 151 of the communication control section 101 determines a predetermined number of functions from the plurality of functions on the basis of the designated function information notified by the communication terminal apparatus 200 and control information notified by the communication terminal apparatus 200 (information notified by the control slot in FIG. 6). The identifier generation section 152 generates a terminal function identifier and function corresponding information on the basis of selection function selected by the function selecting section 151 and the communication control apparatus 100 notifies the terminal function identifier group and the function corresponding information (combination of functions) thus generated to the communication terminal 200.

The communication terminal apparatus 200 receives the connection permit, terminal function identifier group, and function corresponding information from the communication control apparatus 100 and replies connection confirmation (S13). The communication control apparatus 100 and the communication terminal apparatus 200 use the allocated terminal function identifier (terminal function identifier group) in the communication thereafter (S14). The identifier selecting section 104 of the communication control apparatus 100 selects one terminal function identifier from the terminal function identifier group thus generated and carries out communication. This lasts until there is change in the function corresponding information. That is, this lasts until the communication terminal apparatus 200 selects again a function which enables switching of functions and notifies the designated function information to the communication control apparatus 100 or the communication control apparatus 100 changes a function in response to the change in communication condition and there occurs a change.

In a case where there is a change in a parameter, which enables a function to be changeable, by increased moving speed or the like of the communication terminal apparatus 200, the communication terminal apparatus 200 notifies a terminal ability change request to the communication control apparatus 100 (S15). At this time in the communication terminal apparatus 200, the communication control section 201 generates again a function to enable switching of function depending on the communication condition by allowing switching and a function to use a fixed value without switching a function as designated function information and the communication terminal apparatus 200 notifies again the designated function information thus generated as current terminal ability to the communication control apparatus 100.

The communication control apparatus 100 receives the terminal ability change request and notifies the communication terminal apparatus 200 which notifies the terminal ability change request an ability change permit (S16). Moreover, in the communication control apparatus 100, the function selecting section 151 of the communication control section 101 generates the terminal function identifier (terminal function identifier group) and the function corresponding information again and the communication control apparatus 100 notifies the terminal function identifier group and the function corresponding information. The terminal function identifier group generated again at this time may overlap the former one.

The communication terminal apparatus 200 receives the ability change permit, terminal function identifier group, and function corresponding information from the communication control apparatus 100 and transmits ability change confirmation to the communication control apparatus 100 (S17). The communication control apparatus 100 and the communication terminal apparatus 200 use the re-generated terminal function identifier group in the communication thereafter (S18).

Moreover, in the communication control apparatus 100 and the communication terminal apparatus 200, following operations are carried out in addition to the operation shown in FIG. 11.

First, an explanation will be given of a case of the communication control apparatus 100. The communication control section 101 utilizes information data from the backbone or other control data such as the CQI data transmitted from the communication terminal apparatus 200 to determine which data slot is to be allocated to which communication terminal apparatus 200 and to generate allocation information and at the same time determines modulation methods of each data slot. Selection between distributed and localized is also made here. The allocation information and the modulation information are inputted to the terminal ID selecting section 102, the modulation method selecting section 103, and the identifier selecting section 104.

The control slot generation section 105 inputs the terminal function identifier and the modulation method and generates data for a control slot according to the acquired terminal function identifier and modulation method. The communication control section 101 transmits data for the communication terminal apparatus 200 to the data slot generation section 106 and the data slot generation section 106 generates content of the data slot. The frame data generation section 107 aligns data for the data slot on the basis of the allocation information and the modulation information to complete frame data. The frame data thus completed is transmitted to the communication terminal apparatus 200 through the mapping section 109, the modulation section 110, and the RF section 111.

Form of an uplink signal transmitted from the communication terminal apparatus 200 can be basically any form as long as the signal can ensure reliability that enables to carry out each of processing shown in FIG. 11 or ARQ control. For example, a method used for personal digital cellular (PDC) or a method used for wireless local area network (LAN) may be used.

The ARQ control section 108 carries out control of ARQ by control signals transmitted from the communication terminal apparatus 200 to the data of the transmitted slot. Because the communication terminal apparatus 200 transmits transmission/non-transmission of data of the slot on the basis of the ARQ control signals at the time of transmission, content of each slot is transmitted again by the signals. In a case where transmission fails after trying retransmission for a predetermined period of time, the transmission data is discarded as timeout. The timeout period is set by information exchanged when the communication terminal apparatus 200 makes a connection request and information exchanged when the ability change is made.

When the soft handover is carried out, the communication control section 101 carries out communication through a communication control section and a backbone of a soft handover target and the soft handover is realized by transmission from both sides after adjusting timing, modulation method, and transmission data to be transmitted from both sides. Whether this soft handover is carried out or not is set by information exchanged when the communication terminal apparatus 200 makes connection and information exchanged at the time of ability change.

Next, the communication terminal apparatus 200 will be explained. The communication terminal apparatus 200 carries out a connection request following procedures shown in FIG. 11 upon finding the communication control apparatus 100. At this time, the communication control section 201 receives a control slot transmitted from the communication control apparatus 100 in advance to check the quality of the received signal, determines which function is used with a fixed value and which function is selective, and notifies them by use of designated function information to the communication control apparatus 100 at the time of connection request. The communication control apparatus 100 which received the connection request determines a terminal function identifier group to be used by the communication terminal apparatus 200 and notifies the determination to the communication terminal apparatus 200 which made the connection request. However, at this point, the communication terminal apparatus 200 itself does not know which terminal function identifier is allocated and therefore, the communication control apparatus 100 notifies this information by use of an identifier for broadcasting. The identifier for broadcasting indicates that the information must be received by all the communication terminal apparatuses 200 included in the network and a previously fixed value is to be used. The communication terminal apparatus 200 carries out communication using a terminal function identifier if the terminal function identifier information of the communication terminal apparatus 200 itself is included in the broadcast information. If allocation information of the terminal function identifier could not be received, connection request is made again.

Figure 12:
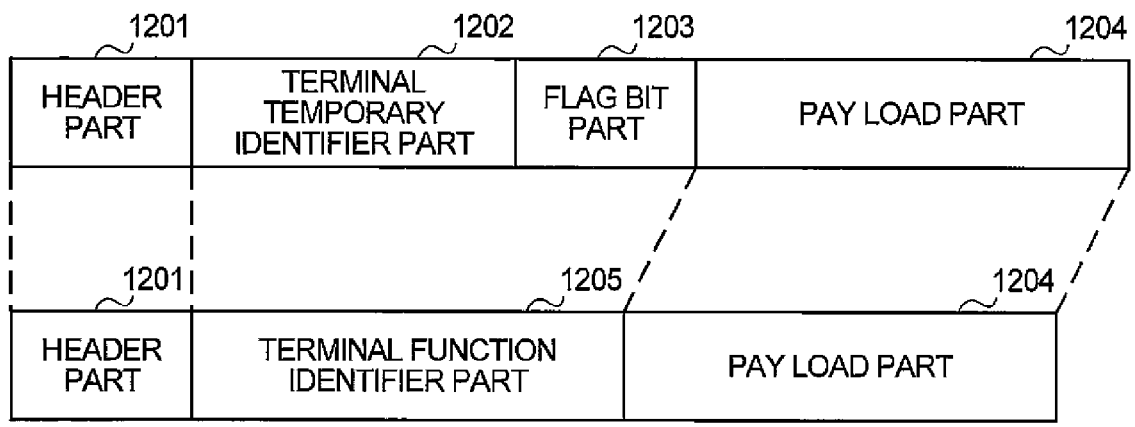
[FIG. 12] A view showing an example of packet configuration for transmission to the communication terminal apparatus in a conventional method and the first embodiment.

Next, a case where a terminal function identifier of the present embodiment is used and a case where a conventional terminal temporary identifier and a flag bit are used will be compared. FIG. 12 is a view showing an example of packet configuration for transmission to the communication terminal apparatus 200 in a conventional method and the first embodiment. The upper part of FIG. 12 is an example of conventional packet configuration while the lower part of FIG. 12 is an example of packet configuration of the present embodiment.

A header part 1201 includes control information other than a flag bit such as an ID for identifying the communication control apparatus 100 or a time stamp. A terminal temporary identifier part 1202 stores a terminal temporary identifier (logical identifier). A flag bit part 1203 stores a flag bit. A payload part 1204 stores communication data main body. The terminal temporary identifier part 1202 is a logical identifier used by a conventional method and has a one-to-one relation between the communication control apparatus 100 where the terminal temporary identifier part 1202 is stored and the communication terminal apparatus 200.

Moreover, a terminal function identifier part 1205 stores the terminal function identifier explained in the present embodiment. The terminal temporary identifier part 1202 and the flag bit part 1203 are equivalent to the terminal function identifier part 1205. One or a plurality of terminal function identifiers are allocated to one communication terminal apparatus 200 and at the same time functions used to each terminal function identifiers are allocated. Therefore, an ability to specify a communication terminal apparatus 200 and an ability to specify a function to be used when communicating are correlated.

As shown in FIG. 12, the terminal function identifier part 1205 selects a function depending on the communication condition and therefore an area of the flag bit part 1203 is reduced and information amount is reduces as a whole. Moreover, in FIG. 12, an example where information amount of the terminal function identifier part 1205 becomes larger than the information amount of the terminal temporary identifier part 1202 is shown. However, there may be a case where the terminal function identifier part 1205 has the same information amount as the terminal temporary identifier part 1202. In FIG. 12, the terminal function identifier part 1205 issues a plurality of identifiers to one communication terminal apparatus 200 and therefore a case where the information amount of the terminal function identifier part 1205 is larger than that of the terminal temporary identifier part 1202 is assumed and shown.

Using the above procedures, the control procedure shown above can be utilized and following the procedure, control is carried out to enable communication with minimized amount of information used for function switching.

As mentioned above, it becomes possible to minimize information amount of a flag for each of the communication terminal apparatus 200 used for switching functions of the communication terminal apparatus 200 by carrying out communication while corresponding a function and a terminal function identifier between the communication control apparatus 100 and the communication terminal apparatus 200. Especially, in a case where it is assumed that there is deviation in the ability of a communication terminal apparatus 200 group held by the communication control apparatus 100, for example, a case where communication terminal apparatuses 200 which is used as a remote sensor and hardly has change in parameter are included with a certain ratio, a terminal function identifier space prepared for a parameter to enable change of function can be set smaller than "number of terminals which can be held"×"number of functions which can be selected". Therefore, it becomes possible to reduce the information amount than a case where a normal function flag bit row is used.

Here in the present embodiment, a terminal function identifier is allocated by the communication control apparatus 100 upon request from the communication terminal apparatus 200 (designated function information). However, allocation of a terminal function identifier may be carried out taking circumstances of the communication control apparatus 100 into consideration. For example, in a case of a small communication control apparatus 100 which has limitation in usable functions, for example the antennas for MIMO is limited to two, even if four antennas for MIMO are requested, only two may be allocated. Moreover, same is applied to a case where number of communication terminal apparatuses 200 held by the communication control apparatus 100 becomes large and many functions cannot be allocated to a terminal function identifier.

Second Embodiment

In the first embodiment, a terminal function identifier group is used for a parameter which is changed at the time of transmission. In a second embodiment, an example where a reply from a receiver side is controlled by a value of a terminal function identifier will be explained.

In the OFDMA system, it is required to cause each of the communication terminal apparatuses 200 to transmit CQI to the communication control apparatus 100 and to allocate sub-channels having good communication quality to all the communication terminal apparatuses 200 to obtain a user diversity effect. If all the communication terminal apparatuses 200 are caused to frequently transmit CQI in all the sub-channels, it becomes possible to carry out an ideal allocation of sub-channels. However, in this case, a large portion of an uplink bandwidth is consumed by the transmission of CQI alone.

An efficient number of sub-channels transmitting CQI differs depending on the communication condition of the communication control apparatus 100 or the like. For example: (1) In a case where there are many communication terminal apparatuses 200 held by the communication control apparatus 100, or communication amount to each of the communication terminal apparatuses 200 is large enough and there is no sub-channel which can be allocated other than the currently-used sub-channel, one CQI is transmitted; (2) In a case where there are certain amount of unused sub-channels and communication condition is relatively stable, two CQI of a sub-channel, which has the best quality, of all the currently-used sub-channels and other sub-channels are transmitted; (3) In a case where condition of a propagation channel changes frequently, CQI of all the sub-channels are transmitted; and (4) In a case where the propagation channel is not stabilized at all and it is meaningless to transmit CQI, CQI is not transmitted at all. Such operation methods are conceivable as an example.

In this example, the latter two cases are where propagation condition is bad and if a communication terminal apparatus 200 which is not likely to have bad propagation condition is held, as shown in (3), transmission of CQI of all the sub-channels does not substantially occur and if all the transmission methods of CQI are corresponded all the time, use efficiency of information is decreased. That is, if there are many communication terminal apparatuses 200 having low moving speed or communication terminal apparatuses 200 used in a fixed manner like a remote sensor, unused bits are increased.

Here, it is possible to increase storage efficiency by previously determining a transmission method of CQI having a possibility of use and allocating a terminal function identifier to each of them as shown in the first embodiment. For example, it is assumed that there are address spaces from 0 to 2047 for allocating a terminal function identifier and excluding address spaces for the communication control apparatus 100, broadcast, and multi-cast, address spaces 1 to 1983 are used. Then, it is possible to determine functions to be used on the basis of the value of the terminal function identifier in such a manner as address spaces 1 to 511 transmit one CQI, address spaces 512 to 1535 transmit two CQI, address spaces 1536 to 1791 transmit CQI of all the channels, and address spaces 1792 to 1983 does not transmit CQI. Here, although a border value of an address is fixed, the border value may be changeable by a method of communication between the communication control apparatus 100 and the communication terminal apparatus 200 or the like.

Configuration of the communication control apparatus 100 and the communication terminal apparatus 200 are the same as those in FIGS. 1 to 4 and therefore explanation thereof is omitted here.

Figure 13:
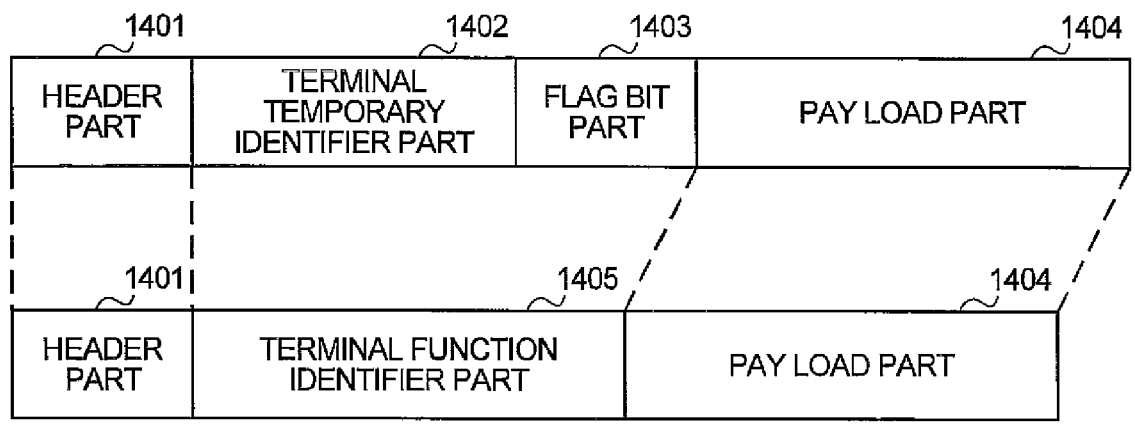
[FIG. 13] A view showing an example of packet configuration for transmission to the communication terminal apparatus in a conventional method and a second embodiment.

Next, a case where a terminal function identifier of the present embodiment is used and a case where a conventional terminal temporary identifier and a flag bit are used are compared. FIG. 13 includes views showing packet configuration for transmission to the communication terminal apparatus 200 in a conventional method and the present embodiment. Upper part of FIG. 13 is a view showing an example of packet configuration of a conventional method and lower part of FIG. 13 shows an example of packet configuration of the second embodiment.

A header part 1401 includes control information other than a flag bit such as an ID for identifying the communication control apparatus 100 or a time stamp. A terminal temporary identifier part 1402 stores a terminal temporary identifier (logical identifier). A flag bit part 1403 stores a flag bit. A pay load part 1404 stores communication data main body. The terminal temporary identifier part 1402 is a logical identifier used by a conventional method and has a one-to-one relation between the communication control apparatus 100 where the terminal temporary identifier part 1402 is stored and the communication terminal apparatus 200.

Moreover, a terminal function identifier part 1405 stores a terminal function identifier explained in the present embodiment. The terminal temporary identifier part 1402 and the flag bit part 1403 are equivalent to the terminal function identifier part 1405. One or a plurality of terminal function identifiers are allocated to one communication terminal apparatus 200 and at the same time transmission number of CQI is allocated to each of the terminal function identifiers by the above-mentioned method. Therefore, the terminal function identifier has both an ability to specify a communication terminal apparatus 200 and an ability to specify a function to be used when communicating. Size of an address space for allocating a terminal function identifier may be the same as or larger than that used in a conventional method. Conventionally, the number of communication terminal apparatuses 200 which can be held by the communication control apparatus 100 is determined by the size of the address space for allocating the terminal function identifier. However, in the present embodiment, the number of communication terminal apparatuses 200 which can be held by the communication control apparatus 100 is determined by the size of the address space for allocating the terminal function identifier and an average of number of terminal function identifiers allocated to one communication terminal apparatus 200. If an average value of the number of terminal function identifiers allocated to one communication terminal apparatus 200 is small, the address space may be the same size as a logical identifier space prepared by a conventional method. However, if an average value of the number of terminal function identifiers allocated to one communication terminal apparatus 200 is large, it is required to prepare an address space for allocating a terminal function identifier having additional space for the large average value.

Moreover, the second embodiment and the first embodiment can be combined for use. For example, in the first embodiment where propagation condition is bad, it is conceivable that distributed is used. If there are cases where CQI is returned to all the channel and CQI is not returned at all, a terminal function identifier used for the case of returning CQI to all the channels in the distributed may be allocated somewhere between 1536 and 1791 and a terminal function identifier used for the case of not returning CQI at all in the distributed may be allocated somewhere between 1792 and 1983. Thus, it becomes possible to select how to return CQI without newly increasing combination information of a terminal function identifier and functions used for the selection of a function.

Third Embodiment

In the first and second embodiments, an example where use efficiency of information is improved by causing a function to correspond to a terminal function identifier was explained. In a third embodiment, an identifier including a terminal temporary identifier and a mode number specifying a function is used, a function to be used in a condition of a communication control apparatus is selected, and ratio of the terminal temporary identifier and the mode number in the information amount of the terminal function identifier is adjusted so that use efficiency of information can be improved.

In the present embodiment, a case where a network topology called a communication control apparatus (control station, base station) and a communication terminal apparatus (mobile station) is used in the OFDMA system is explained. However, the present embodiment can be applied to other network topology.

Figure 14:
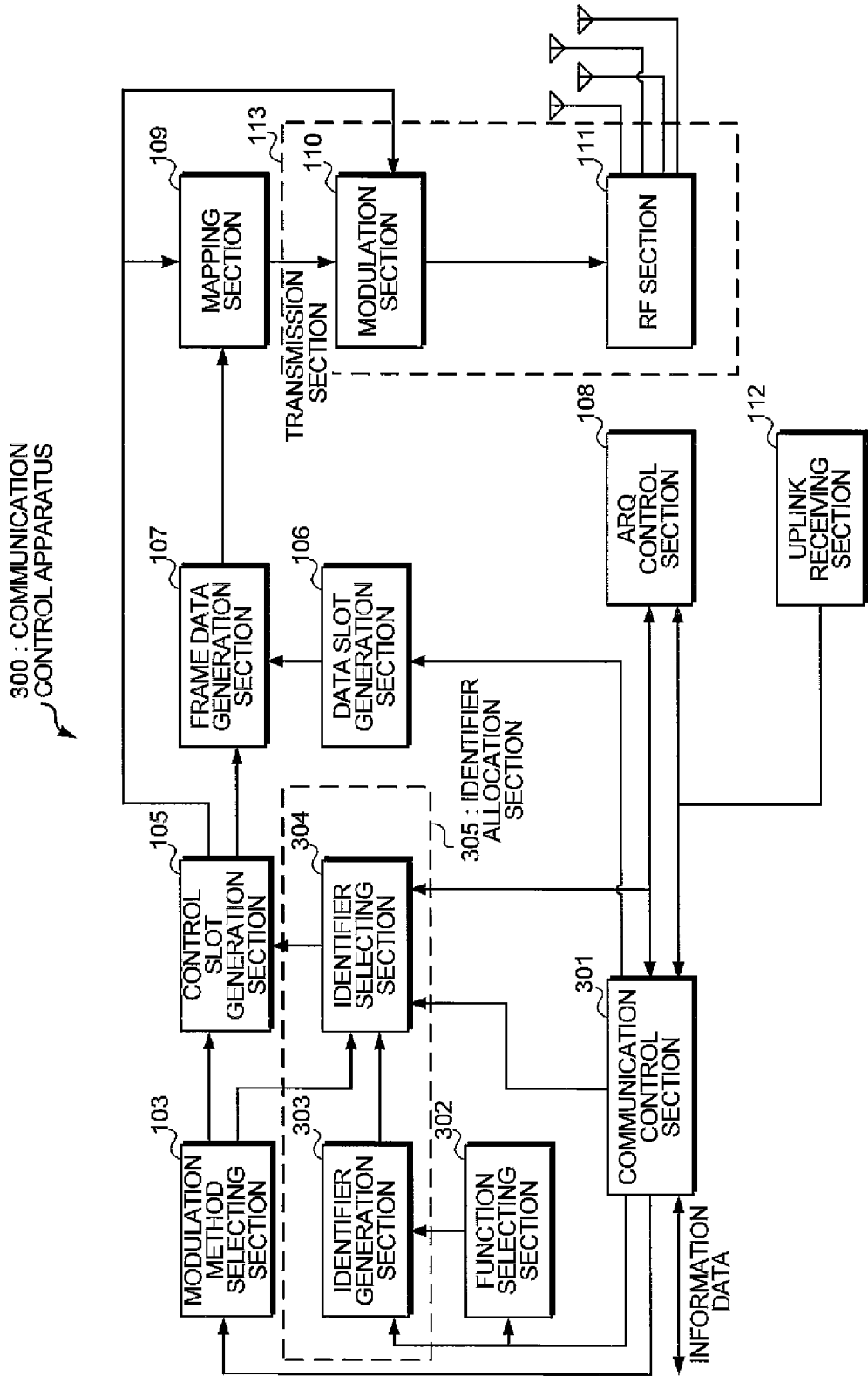
[FIG. 14] A block diagram showing a configuration example of a communication control apparatus of a third embodiment.

FIG. 14 is a block diagram showing a configuration example of a communication control apparatus 300 of the third embodiment. Explanation on the same constituent elements as those in FIG. 1 will be omitted.

A communication control section 301 is in charge of information data through a backbone handled by the communication control apparatus 300 or control of each block of the communication control apparatus 300. Specifically, utilizing control data such as CQI data transmitted from a communication terminal apparatus, it is determined that which data slot is to be allocated to which communication terminal apparatus, and at the same time, modulation method of each data slot is determined. Selection between distributed and localized is also made here. Moreover, number of terminal temporary identifiers is determined by allocation condition of a slot and number of communication terminal apparatuses being held. A communication control section 301 notifies the allocation information and modulation information to the modulation method selecting section 103 and notifies the number of terminal temporary identifiers and other control information including communication condition (communication traffic condition) to a function selecting section 302 and an identifier generation section 303.

The function selecting section 302 selects at least one function as a selection function from a plurality of functions on the basis of an instruction from the communication control section 301 and generates selection function information. The selection function becomes a function which can switch selective items included in the function. The function selecting section 302 selects a selection function from a plurality of functions on the basis of control information notified by the communication control section 301. Moreover, the function selecting section 302 determines the number of selection functions to be selected on the basis of the number of terminal temporary identifiers notified by the communication control section 301.

The identifier generation section 303 generates a terminal temporary identifier and simultaneously a mode number and a function map on the basis of control information notified by the communication control section 301 and selection function information notified by the function selecting section 302 in response to an instruction from the communication control section 301. The mode number is a number specifying a plurality of selective items that the selection function includes. If there are a plurality of selection functions, a plurality of mode numbers specifying combinations of a plurality of selective items that each of the plurality of selection functions has are generated. The function map is information correlating a plurality of mode numbers and selective items that the selection function includes. Moreover, the identifier generation section 303 determines a ratio of a memory for allocating a terminal temporary identifier and a mode number on the basis of at least either the number of communication terminal apparatuses to be connected or requested communication quality, or on the basis of other control information based on information transmitted by the communication control apparatus (including designated function information, control information) and the like. Regarding this, details will be described later by use of FIG. 20.

An identifier selecting section 304 selects one selective item from a plurality of selective items that the selection function has according to an instruction from the communication control apparatus 301 and selects a terminal function identifier correlated to the selected selective item. Specifically, on the basis of terminal ID information (a terminal unique identifier or terminal function identifier) of a communication terminal apparatus to be a communication target (a destination communication apparatus), modulation method information, ARQ control information indicating a type of selected ARQ, or the like, a mode number corresponding to a selective item to be used is selected from a plurality of mode numbers and the identifier generation section 303 selects (generates) a generated terminal temporary identifier and the selected mode number as a terminal function identifier.

An identifier allocation section 305 has a function to generate different terminal identifiers corresponding to each of functions used (terminal function identifiers) and to allocate the terminal identifiers to the destination communication apparatus. FIG. 14 shows an example of a case where the above-mentioned operation is realized by the identifier generation section 303 and the identifier selecting section 304.

Here, the function selecting section 302, the identifier generation section 303, and the identifier selecting section 304 may be executed by the communication control section 301 and each of the constituent elements may be provided in the communication control section 301 or in other location. Moreover, same can be applied to the identifier allocation section 305.

Figure 15:
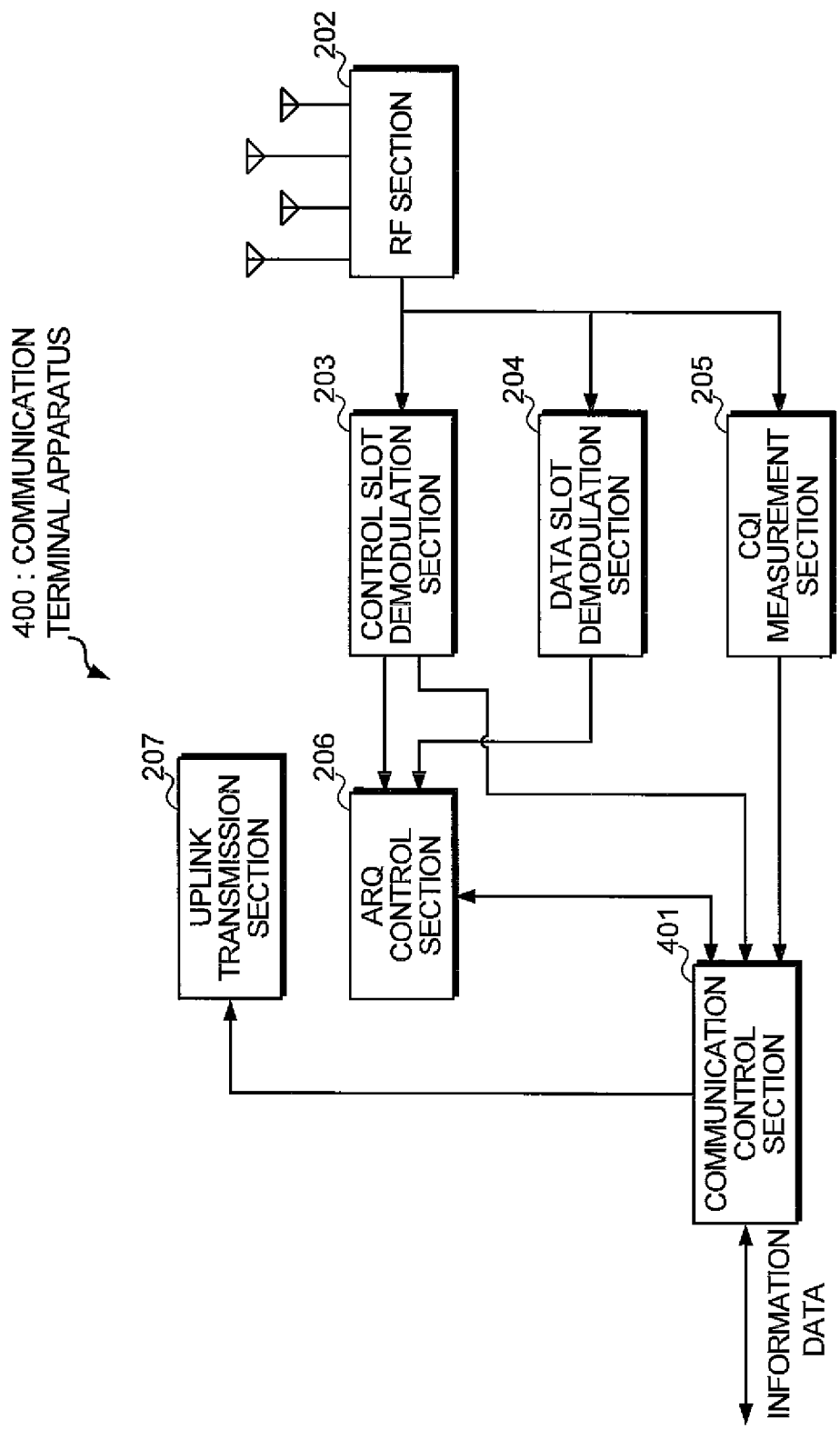
[FIG. 15] A block diagram showing a configuration example of a communication terminal apparatus of the third embodiment.

FIG. 15 is a block diagram showing a configuration example of a communication terminal apparatus 400 of the present embodiment. Explanation on constituent elements same as those in FIG. 2 will be omitted.

A communication control section 401 is in charge of communication control in a communication terminal apparatus 400. The communication control section 401 receives map data including a function map or the like, which will be explained by use of FIG. 22, from the communication control apparatus 300. The communication control section 401 analyzes a terminal function identifier notified by the communication control apparatus 300 on the basis of data such as the function map, acquires a terminal temporary identifier and a function mode, acquires selective items of a function or the like to be used from the function map and the function mode, and carries out communication with the communication control apparatus 300.

Form of an uplink signal transmitted from the communication terminal apparatus 400 to the communication control apparatus 300 can be basically any form as long as the signal can ensure reliability that enables to carry out control shown in the present embodiment or ARQ control. For example, a method used for PDC or a method used for wireless LAN may be used.

ARQ is carried out by a control signal transmitted from the communication terminal apparatus 400 to the data of the transmitted slot. Because the communication terminal apparatus 400 transmits transmission/non-transmission of data of the slot on the basis of the ARQ control signals at the time of transmission, content of each slot is transmitted again by the transmitted signal. In a case where transmission fails after trying retransmission for a predetermined period of time, the transmission data is discarded as timeout. The timeout period is set by information exchanged when the communication terminal apparatus 400 makes a connection request and information exchanged when the ability change is made.

When the soft handover is carried out, the communication control section 301 carries out communication with the communication control section 401 of the communication terminal apparatus 400 on the soft handover target side through a backbone and the soft handover is realized by transmission from both sides after adjusting timing, modulation method, and transmission data to be transmitted from both sides. Whether this soft handover is carried out or not is set by information exchanged when the communication terminal apparatus 400 makes connection with the communication control apparatus 300 and information exchanged at the time of ability change.

In the present embodiment, the frame configuration shown in FIG. 6 is used as well. Explanation on FIG. 6 is the same as that in the first embodiment and therefore omitted here.

FIG. 16 is a view showing an example of a function controlled by the communication controlling apparatus 300 in the present embodiment. In the present embodiment, a case where six functions are used is taken as an example, each function is indicated by use of Flags 1 to 6, and each function has a plurality of selective items. In FIG. 16, an example where functions of Flags 3 and 6 have four selective items, a function of Flag 5 has eight selective items, and functions of other Flags have two selective items is shown. In this example, to transfer the selective items (information) of a function to be used, the Flag 3 requires 2-bit, the Flag 5 requires 3-bit, and other Flags require 1-bit flag bit.

Each of the functions shows the following contents. A first function shown by the Flag 1 indicates whether allocation method of a slot to a communication terminal apparatus is distributed or localized. A second function shown by the Flag 2 indicates whether soft handover is carried out or not. A third function shown by the Flag 3 indicates how many MIMO antennas are to be used. A fourth function shown by the Flag 4 indicates whether ARQ timeout period is set long or short.

A fifth function shown by the Flag 5 indicates what type of modulation method is currently used by the communication control apparatus. A sixth function shown by the Flag 6 indicates bit number of a terminal function identifier currently used by the communication control apparatus. An outline of a function which is switched by the Flags 5 and 6 is shown in the following. Moreover, each of the functions is not directly related to the essence of the present invention and therefore outlines thereof is roughly shown. The other functions are the same as those explained in the first embodiment and therefore explanation thereof is omitted here.

A modulation method shows how each of sub-carriers of the OFDM is modulated and coding rate of an error correction signal. A terminal temporary identifier is an ID temporarily allocated when a communication terminal apparatus is connected to a communication control apparatus and is used for reduction of information in a case where a bit-length of a terminal unique identifier uniquely allocated to the communication terminal apparatus is long. Generally, one terminal function identifier is allocated to one communication terminal apparatus and a few multicast addresses are allocated at most. Therefore, it is necessary to prepare a bit number corresponding to the number of communication terminal apparatuses which can be held by the communication control apparatus.

If all the above-mentioned functions are used and a terminal temporary identifier bit number is used at a maximum, a total of a number of a flag bits indicating functions and a number of bits for a terminal temporary identifier reaches 24 bits. In the present embodiment, functions are indicated by mode numbers generated by the identifier generation section 303. Therefore, it can be said that the memory used for a terminal function identifier which is a sum of a mode number and a terminal temporary identifier reaches 24 bits. To all the information transmitted within the frame, this 24-bit memory for a terminal function identifier (also referred to as a "control information memory" or "identifier memory") is required and therefore, it is better if the control information amount included in the terminal function identifier becomes smaller. Moreover, because information of this bit number is added to the all the communication data, it is preferable that the control information becomes smaller from the viewpoint of communication efficiency. In the present embodiment, information required for the terminal function identifier is efficiently selected according to the condition of the communication control apparatus 300 and stored in the memory. Specific condition of the communication control apparatus 300 will be shown below for an explanation.

First, a condition where all the functions stipulated by specification of the communication control apparatus 300 can be used and the communication terminal apparatuses held by the communication control apparatus 300 is small enough is assumed. In such a condition, the communication control apparatus 300 must allow all the functions to be usable depending on the condition of the communication terminal apparatus 400 and the bit number used for the terminal function identifier must be minimized. A condition where use of functions is prioritized is referred to as a function prioritized condition. FIG. 17 is a view showing an example of a utilization condition of a memory in the function prioritized condition. In the function prioritized condition shown in FIG. 17, a total bit number used for a terminal function identifier which is a sum of a mode number indicating function selection a terminal temporary identifier reaches 18-bit.

Next, a case where usable functions of the small communication control apparatus 300 is limited is assumed. Here, it is assumed that usable functions are limited to switching of distributed/localized, two antennas for MIMO, switching long/short of ARQ timeout periods and modulation methods of QPSK R=½, ¾, 16QAM R=½ and ¾, and a bit number to be used as a terminal function identifier is limited to 12-bit. Such a condition where a part of functions is limited is referred to as a function limitation condition. FIG. 18 is a view showing an example of a utilization condition of a memory in a function limitation condition. In the function limitation condition shown in FIG. 18, total bit number used for a terminal function identifier is 18 bits.

Finally, a case where the number of communication terminal apparatuses 400 held by the communication control apparatus 300 is temporarily increased by commuter rush or the like is assumed. In such a case, it is required to increase the number of usable terminal function identifiers even if usable functions are limited in some degree. A condition where the number of terminal temporary identifiers is prioritized is referred to as a terminal number prioritized condition. FIG. 19 is a view showing an example of a utilization condition of a memory in a terminal number prioritized condition. In the terminal number prioritized condition shown in FIG. 19, total bit number used for a terminal function identifier is 18 bits.

Thus, compared to a case where all the functions and all the terminal temporary identifiers (a maximum number of terminal temporary identifiers) are used (24 bits are used) according to the present embodiment, it becomes possible to require functions with the 6-bit less bit number.

This is, in other words, ratio of length of a bit of a mode number indicating a combination of functions and length of a bit of a terminal function identifier is changed depending on the condition of the communication control apparatus. FIG. 20 is a view showing an example of utilization ratio of a memory for a terminal function identifier. The upper part of FIG. 20 is an example of a case of function prioritized condition and the lower part of FIG. 20 is an example of a case of terminal number prioritized condition. As shown in the upper part of FIG. 20, in a case where the number of functions to be used is increased to reduce bit number used for the terminal function identifier, ratio for usage of mode number is increased, while as in the lower part of FIG. 20, in a case where the number of functions to be used is reduced to increase the bit number used for the terminal function identifier, ratio for the terminal temporary identifier is increased. Here, the mode number depends on the functions and the terminal temporary identifier does not depend on the function. Therefore, an area to which the mode number is allocated can be referred to as an area relying on the function while an area to which the terminal temporary identifier is allocated can be referred to as an area which does not depend on the function. Depending on which function is to be used among a plurality of functions, ratio of an area which depends on the function and an area which does not depend on the function is changed for use.

As mentioned above, in the present embodiment, a memory for a terminal function identifier which is a combination of a mode number and a terminal temporary identifier can be efficiently used depending on the condition of the communication control apparatus 300. Moreover, it is also possible to optimize utilization condition of the memory depending on the condition of the communication control apparatus 300. Further, it is possible to change usage of the memory depending on the condition of the communication control apparatus 300 and therefore it becomes possible to reduce memory amount allocated to a terminal function identifier.

Next, an example of allocating a mode number will be explained showing a case of a function limitation condition shown in FIG. 18 as an example. In FIG. 18, a case where usable functions are limited to switching of distributed/localized, two antennas for MIMO, switching long/short of ARQ timeout period, and modulation methods of QPSK R=½, ¾, 16QAM R-½ and ¾ is assumed. Numbers of bits required to express a function used in this function limitation condition are 5 bits: 1 bit for switching distributed/localized; 1 bit for switching one/two antennas for MIMO; 1 hit for switching long/short of ARQ timeout period; 2 bits for switching four types of modulation methods. Mode numbers are allocated to all these combinations. FIG. 21 is a view showing an example of allocation of a mode number in the case of function limitation condition shown in FIG. 18. In the present embodiment, a table for allocation of mode numbers shown in FIG. 21 is referred to as a function map. The identifier generation section 303 allocates (generates) a mode number specifying selective items of each function and generates a function map correlating the selective items of each function and mode numbers.

In a case where the number of functions used is changed according to the number of communication terminal apparatuses 400 held by the communication control apparatus 300, judgment can be made by whether the number of terminals exceeded a predetermined threshold value or not. In order not to increase the update frequency of the function map, the threshold value may have hysteresis characteristics with a certain width.

Here, a case where the number of functions of the communication control apparatus 300 is adjusted according to the number of terminals held is explained. However, the number of terminals held may be adjusted to prioritize the number of functions of the communication control apparatus 300. A case where communication with high data rate is requested by the communication control apparatus 300 and a modulation method with high multiplicity such as multi-antenna MIMO, 16 QAM, or 64 QAM must be used corresponds to this case. In such a case, number of functions of the communication control apparatus 300 may be increased as much as needed and the bit number of the terminal temporary identifier may be reduced.

Generation of the terminal function identifier shown in FIGS. 17 to 19 and generation of the function map shown in FIG. 21 are executed by the following procedure. The function selecting section 302 determines the number of functions to be selected by the communication control apparatus 300 as selection functions and selects selection functions from the plurality of functions on the basis of the condition of communication control apparatus 300 notified by the communication control section 301. Condition of the communication control apparatus 300 includes number of the communication terminal apparatuses 400 to be connected (number of terminals held), processing ability of the communication control apparatus 300, requested communication quality and the like, as mentioned above. Next, the identifier generation section 303 determines ratio of a memory shown in FIG. 20 on the basis of the number of selection functions selected by the function selecting section 302 and control information including the condition of the communication control apparatus 300 notified by the communication control section 301. Subsequently, the identifier generation section 303 generates mode numbers specifying selective items of each function on the basis of terminal temporary identifiers fulfilling the number of terminals held being connected and selection function selected by the function selecting section 302 and further generates a function map. Here, regarding functions which were not selected by the function selecting section 302, any one of selective items that each function has is set to be a fixed value to cause the functions to be fixed value functions.

Next, a method to notify the function map to a communication terminal apparatus 400 held by the communication control apparatus 300 will be shown. The communication control apparatus 300 notifies the function map and the fixed value function to the communication terminal apparatuses 400. Although the function map and the fixed value function are large information, update frequency thereof is very low. Therefore, the communication control apparatus 300 can notify them to each of the communication terminal apparatuses 400 even though it takes time.

Figure 22:
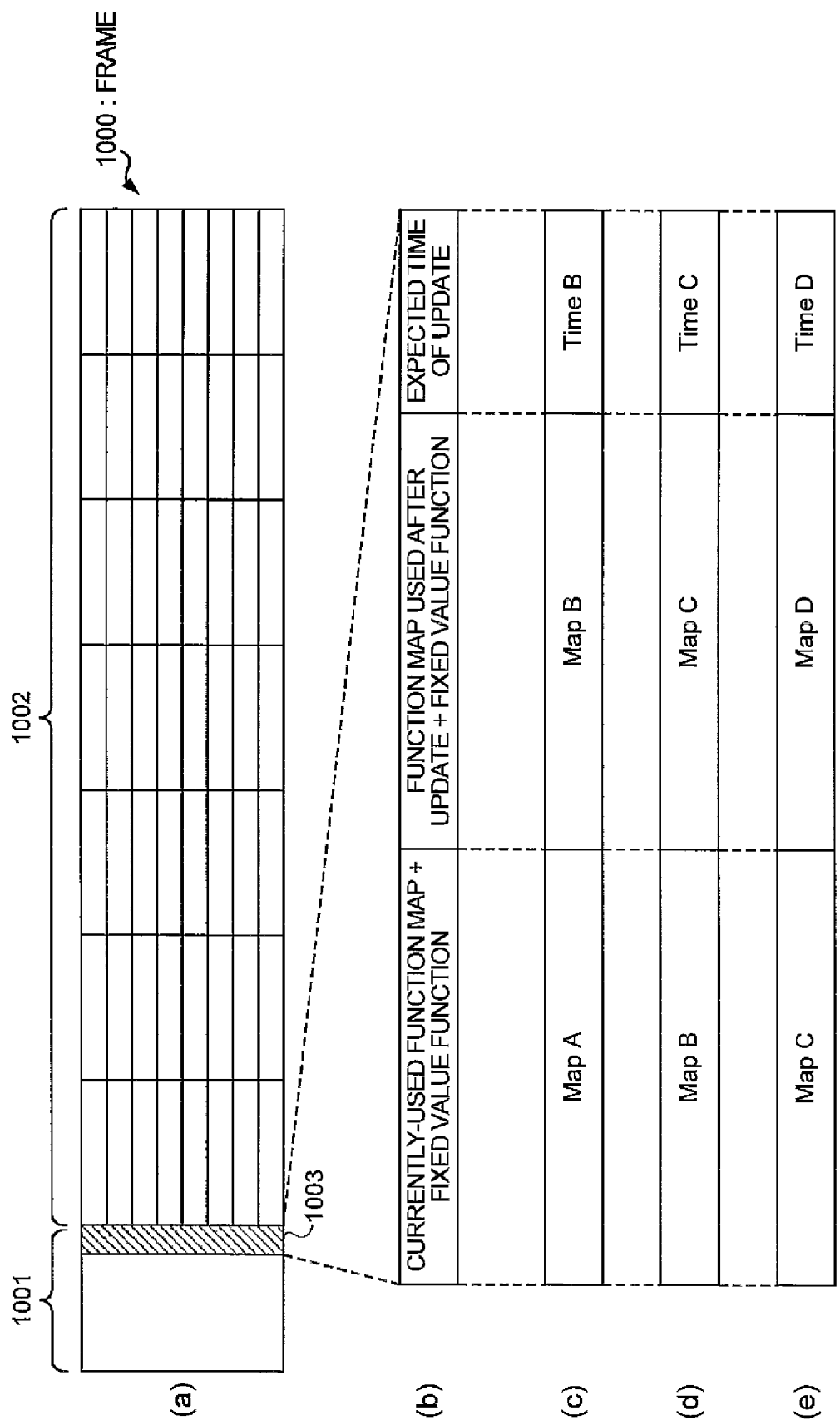
[FIG. 22] A view showing an example of a frame configuration and an example of data configuration of a function map.

FIG. 22 is an example of a frame configuration and an example of data configuration of the function map to be notified. As shown in FIG. 22 (*a*), utilizing a part 1003 of a control slot 1001 in a frame 1000 (a shaded area), a plurality of frames are used to notify in the present embodiment. For example, consecutive 32 frames are assumed to be 1 set and notification of the function map and the fixed value function is carried out. Hereinafter, the function map and the fixed value function may be referred to as "function map and the like".

Moreover, the function map and the fixed value function used by the communication control apparatus 300 and the function map and the fixed value function understood by the communication terminal apparatus 400 must correspond one to one. If this correspondence does not match, required information cannot be taken on the communication terminal apparatus 400 side. Therefore, the communication terminal apparatus 400 notifies in advance before the function map and the like is changed simultaneously with the transmission of the same information a plurality of times carried out to prevent failure in reception. The communication control apparatus 300 uses the currently used function map and the fixed value function, a function map and a fixed value function to be used from the next update time, and estimated time of update as shown in FIG. 22 (*b*). Data configuration shown in FIG. 22 (*b*) is assumed to be map data. Moreover, in the control slot 1001, it is assumed that time in the communication control apparatus 300 is displayed. As an example, it is assumed that update of the function map and the like is carried out with the unit of 512 mS, one frame is expressed by 2 mS and the map is expressed by 32 frames one set, same information can be transmitted eight times within the 512 mS. Further, the communication control apparatus 300 transmits a Map A which is the function map and the like currently used, a Map B to be used after update, and a Time B which is an estimated time of next update at time A as shown in FIG. 22 (*c*), transmits the Map B which is the function map and the like currently used, a Map C to be used after update, and a Time C which is an estimated time of next update at time B as shown in FIG. 22 (*d*), and transmits the Map C which is the function map and the like currently used, a Map D to be used after update, and a Time C which is an estimated time of next update at time D as shown in FIG. 22 (*e*).

The communication terminal apparatus 400 causes the current time shown in the control slot 1001 and time inside the communication terminal apparatus 400 to be synchronized and updates the function map and the like to a new function map and the fixed value function when the estimated time of update comes. In the present embodiment, there are eight receiving opportunities until the function map and the like are updated and therefore in most cases, the update of the function map and the like succeeds. If reception cannot be made for a long period of time, the communication terminal apparatus 400 must stop receiving following data slot 1002 until correct map data is received.

Here, a serial number updated every time the function map is updated may be added to the function map included in the map data. In this case, it is possible to explicitly show that the content of the function map is not changed even if the update time indicated in the map data comes. If the serial number is added, there is a disadvantage that information for the amount of the serial number is increased. However, there is an advantage that even if the communication terminal apparatus 400 fails to receive the map data for a period longer than the update period of the map data due to a certain reason, it is immediately understood that the data has not been changed by checking the serial number and reception processing can be resumed at this point of time.

As explained above, if the communication terminal apparatus 400 finds the communication control apparatus 300, function map data in a control slot is received. After confirming the function map data is received without an error, the communication terminal apparatus 400 starts connection operation. Subsequently, the communication terminal apparatus 400 keeps receiving map data allocated to the part 1003 in the control slot 1001, checks update time in the map data, and carries out update of the function map and the like referred in the communication terminal apparatus 400 at a designated time. Thus, demodulation of the data slot 1002 provided after the control slot is enabled. If the function map and the like can be correctly updated, the communication terminal apparatus 400 can carry out normal communication.

Using the above procedures, it becomes possible to carry out communication in a condition where information amount for selection of a function used by the communication control apparatus and designation of the communication terminal apparatus can be reduced.

Thus, according to the present embodiment, the identifier generation section 303 is enabled to generate a mode number in response to the number of selection function without corresponding to all of a plurality of functions and it becomes possible to suppress information amount required for adaptive modulation control. Moreover, the identifier generation section 303 can flexibly change ratio of the memory allocated to the terminal temporary identifier and the mode number depending on the condition of the communication control apparatus 300. Thus, depending on the communication condition, it becomes possible to generate a terminal function identifier. Therefore, it becomes possible to optimize the information amount required for the adaptive modulation control. Further, a communication apparatus of the present invention can suppress information amount as a selection function can be selected from a plurality of functions and ratio of a memory can be changed.

Here in each of the above-mentioned embodiments, the function selecting section, the identifier generation section, and the identifier selecting section can be executed by a hardware such as a circuit, by a software, or a combination of a software and a hardware. In a case where the sections are executed by a software, a program is loaded in a memory in a communication apparatus in a calculator and under the control of a central processing operation apparatus, each of the processing is carried out. This is a program to realize a communication method which allocates a terminal identifier to a destination communication apparatus and carries out communication with the destination communication apparatus by use of a plurality of functions in the communication apparatus (on the calculator), which executes a step to generate different terminal identifiers corresponding to functions used and to allocate the terminal identifiers to the destination communication apparatus. A more specific example is a program to realize a communication method of a communication apparatus which carries out communication with a destination by use of a plurality of functions having a plurality of selective items in the communication apparatus (on the calculator) and includes the following steps as an example.

(1) A step to select at least one function from the plurality of functions as a selection function. (2) A step of generating a plurality of terminal function identifiers correlating the destination communication apparatus and the plurality of selective items that the selection function has. (3) A step of selecting one selective item from the plurality of selective items that the selection function has. (4) A step of selecting a terminal function identifier correlated with the selected selective item from the plurality of terminal function identifiers. (5) A step of transmitting a selected terminal function identifier to the destination communication apparatus. Here, any step other than (1) to (5) may be included and a step of realizing each processing explained in each of the above-mentioned embodiments may be further included.

Here, configuration of the communication apparatus explained in each of the above-mentioned embodiments and each of constituent elements are detailed means for realization and the present invention is not limited thereto. Other embodiments can be applied as long as the configuration thereof realizes a function to allocate different terminal identifiers to a destination communication apparatus for the functions used in a communication apparatus which carries out communication with the destination allocating the terminal identifiers to a destination communication apparatus and using a plurality of functions. For example, the identifier generation section explained in each of the above-mentioned embodiments includes a function to allocate a terminal function identifier (terminal identifier) to a destination communication apparatus. The function to allocate the terminal function identifier (terminal identifier) is not limited to the function of the identifier selecting section and may include a part of the function executed by the communication control section (e.g., function shown in FIG. 3) or function (a part of function) of the identifier generation section 303 and the function of the function selecting section 302 shown in FIG. 14. As shown in FIGS. 3 and 14, the identifier allocation section may include a constituent element having functions of the identifier generation section and the identifier selecting section.

As mentioned above, according to the embodiment of the present invention, it becomes possible to optimize information amount required for adaptive modulation control by use of the terminal function identifier explained in each of the above-mentioned embodiments. Thus, it becomes possible to optimize size of a memory for storing information required for the adaptive modulation control. Moreover, since the function selecting section selects a selection function from a plurality of functions, information amount to be notified is reduced. Therefore, it becomes possible to suppress the information amount required for the adaptive modulation control.

What is claimed is:

1. A communication apparatus for allocating a terminal identifier to a destination communication apparatus and communicating with the destination communication apparatus using a plurality of functions comprising:
a terminal identifier allocation section comprising circuitry for generating a plurality of terminal identifiers; wherein each of the terminal identifiers is configured for identifying a destination communication apparatus and a function selected from the plurality of functions used for communication and for allocation of the terminal identifiers to the destination communication apparatus; and said generating plurality of terminal identifiers comprises:
changing size of address space for allocated terminal identifiers for a destination communication apparatus changes depending on determining which function is to be used among a plurality of functions by the communication apparatus on the basis of at least one of: the number of destination communication apparatuses to be connected, requested communication quality, and information received from the destination communication apparatus; and
a transmission section includes at least one antenna for transmitting the terminal identifiers to the destination communication device and exchange data based on one of the allocated identifiers.

2. The communication apparatus according to claim 1, wherein each of the terminal identifiers at least includes an area, the length of which depends on a function.

3. The communication apparatus according to claim 1, wherein the identifier allocation section generates a group of terminal identifiers corresponding to a function and allocates a terminal identifier included in the group, which corresponds to the destination communication apparatus and to a function used, to the destination communication apparatus.

4. The communication apparatus according to claim 1, wherein the plurality of functions include at least one of: types of modulation method, coding rate, stream number of MIMO (Multi Input Multi Output) communication, number of antennas used for MIMO communication, types of automatic repeat request (ARQ), number of institutionalized communication apparatuses, and notification method of the CQI (channel quality information).

5. The communication apparatus according to claim 1, further comprising:
a function selecting section for selecting a predetermined number of functions to be used for communication,
wherein the identifier allocation section generates and allocates a terminal identifier to the destination communication apparatus on the basis of the selected predetermined number of functions.

6. The communication apparatus according to claim 5, wherein the function selecting section limits the number of functions to be used on the basis of at least one of: number of destination communication apparatuses to be connected, requested communication quality, and information received from the destination communication apparatus.

7. The communication apparatus according to claim 5, wherein the function selecting section selects a function to be used on the basis of at least one of: the number of destination communication apparatuses to be connected, requested communication quality, and information received from the destination communication apparatus.

8. The communication apparatus according to claim 1, wherein the identifier allocation section further generates function corresponding information to indicate corresponding functions correlated with each terminal function identifier thus generated and the terminal identifiers, and
further includes the transmission section is further configured for transmitting the function corresponding information thus generated to a communication destination apparatus.

9. A communication apparatus for allocating a terminal identifier to a destination communication apparatus and carrying out communication with the destination communication apparatus by utilizing a plurality of functions comprising:

an identifier allocation section comprising circuitry for generating a plurality of terminal identifiers correlating a destination communication apparatus and a plurality of functions selected from the plurality of functions and used for communication and for allocating the terminal identifiers to the destination communication apparatus, wherein each terminal function identifier includes an area for temporarily identifying the destination communication apparatus, wherein said generating plurality of terminal identifiers comprises changing the size of address space for allocated terminal identifiers for the destination communication apparatus depending on determining which function is to be used among a plurality of functions by the communication apparatus on the basis of at least one of: the number of destination communication apparatuses to be connected, requested communication quality, and information received from the destination communication apparatus; and a transmission section includes at least one antenna for transmitting the terminal identifiers to the destination communication device and exchange data based on one of the allocated terminal identifiers.

10. The communication apparatus according to claim 9, wherein the terminal identifier includes a terminal temporary identifier which temporarily identifies a terminal, and the area which depends on the function includes mode numbers corresponding to each of a plurality of combinations of a plurality of functions.

11. A communication method to allocate a terminal identifier to a destination communication apparatus and to carry out communication with the destination communication apparatus by use of a plurality of functions comprises the steps of:

generating different terminal identifiers, each identifying the destination communication apparatus and functions selected from the plurality of functions to be used for communication with the destination communication apparatus; and allocating said different terminal identifiers to the destination communication apparatus, such that the size of address space for allocated terminal identifiers for the destination communication apparatus changes depending on which function is to be used among a plurality of functions by the communication apparatus, the function chosen on the basis of at least one of: the number of destination communication apparatuses to be connected, requested communication quality, and information received from the destination communication apparatus, transmitting the terminal identifiers to the destination communication device and exchange data based on one of the allocated identifiers.

12. A communication apparatus for allocating identifiers to be used to identify destination communication apparatuses and communicating with the destination communication apparatuses using a plurality of functions comprising:

a terminal identifier allocation section comprising circuitry for generating terminal identifiers: wherein each of the terminal identifiers is configured to identify correlation of a function included in the plurality of functions and identifiers for the destination communication apparatuses and for allocation of the terminal identifiers to the destination communication apparatuses, wherein said generating plurality of terminal identifiers comprises varying a ratio of the size of an area holding the function to the size of an area holding the identifiers for the destination communication addresses depending on which function is to be used among a plurality of functions by the communication apparatus determined on the basis of at least one of: the number of destination communication apparatuses to be connected, requested communication quality, and information received from the destination communication apparatus; and a transmission section which includes at least one antenna for transmitting the terminal identifiers to the destination communication device and exchange data based on one of the allocated terminal identifiers.

* * * * *